(12) United States Patent
Watson

(10) Patent No.: US 11,199,179 B2
(45) Date of Patent: Dec. 14, 2021

(54) POWER GENERATING APPARATUS AND METHOD

(71) Applicant: ElectricSands Ltd., Wirral (GB)

(72) Inventor: Gary Alexander Watson, Moreton Wirral (GB)

(73) Assignee: Gary Alexander Watson, Moreton (GB)

( * ) Notice: Subject to any disclaimer, the term of this patent is extended or adjusted under 35 U.S.C. 154(b) by 0 days.

(21) Appl. No.: 16/930,779

(22) Filed: Jul. 16, 2020

(65) Prior Publication Data

US 2020/0347831 A1 Nov. 5, 2020

Related U.S. Application Data

(63) Continuation-in-part of application No. PCT/GB2020/050523, filed on Mar. 5, 2020, which is
(Continued)

(30) Foreign Application Priority Data

Mar. 12, 2018 (GB) .................................. 1803944
Mar. 7, 2019 (GB) .................................. 1903042
Jul. 26, 2019 (GB) .................................. 1910713

(51) Int. Cl.
*F03G 3/04* (2006.01)
*F03G 3/02* (2006.01)
(Continued)

(52) U.S. Cl.
CPC ................. *F03G 3/02* (2013.01); *F03G 3/08* (2013.01); *B65D 88/121* (2013.01); *F03G 3/04* (2013.01);
(Continued)

(58) Field of Classification Search
CPC ..... F03G 3/02; F03G 3/04; F03G 3/08; F05B 2220/7064; F05B 2240/90; B65B 88/121
(Continued)

(56) References Cited

U.S. PATENT DOCUMENTS

| | | | | |
|---|---|---|---|---|
| 515,674 A | * | 2/1894 | Guldhaug | F03G 3/00 60/639 |
| 1,054,710 A | * | 3/1913 | Olsen | F03B 7/003 415/66 |
| 1,276,112 A | * | 8/1918 | Reed | F03B 13/186 60/507 |

(Continued)

FOREIGN PATENT DOCUMENTS

| CN | 1263991 A | 8/2000 |
|---|---|---|
| CN | 108050025 | 5/2018 |

(Continued)

*Primary Examiner* — Phillip A Johnson
(74) *Attorney, Agent, or Firm* — Renner Kenner Greive Bobak Taylor & Weber

(57) ABSTRACT

An apparatus for generating electricity from falling material includes a capture wheel arranged to receive a falling material and be rotated thereby. The capture wheel may be mounted on a transportable housing having a generator therein. The housing may be a shipping container and the apparatus may be arranged to fit entirely within the shipping container for transportation. The capture wheel may include a hub comprising a central core encapsulated in a layer of resilient material; a wheel framework extending from the hub, wherein the wheel framework is connected to the resilient layer; and a plurality of bucket sections mounted on the wheel framework and arranged to receive the falling material. The hub may be a tri-layer hub including a central core, a layer of resilient material, and an outer support ring surrounding the layer of resilient material. A method of generating electricity using such an apparatus is also disclosed.

20 Claims, 14 Drawing Sheets

Related U.S. Application Data a continuation of application No. PCT/GB2019/050636, filed on Mar. 7, 2019.

(51) Int. Cl.
*F03G 3/08* (2006.01)
*B65D 88/12* (2006.01)

(52) U.S. Cl.
CPC ... *F05B 2220/7064* (2013.01); *F05B 2240/90* (2013.01)

(58) Field of Classification Search
USPC .......................................................... 60/639
See application file for complete search history.

(56) References Cited

U.S. PATENT DOCUMENTS

| | | | |
|---|---|---|---|
| 3,987,307 A | 10/1976 | Giconi | |
| 4,030,300 A | 6/1977 | Thompson | |
| 7,222,487 B1* | 5/2007 | Hinkley | F03B 17/005 290/43 |
| 8,753,006 B2 | 6/2014 | Baldwin et al. | |
| 2016/0108888 A1* | 4/2016 | Ippolito | F03D 5/06 416/229 R |

FOREIGN PATENT DOCUMENTS

| | | | | |
|---|---|---|---|---|
| CN | 209163989 | | 7/2019 | |
| DE | 202012006352 U1 * | | 7/2012 | ............ F03G 3/04 |
| JP | 2017152128 | | 8/2017 | |
| WO | 2016147038 | | 9/2016 | |

* cited by examiner

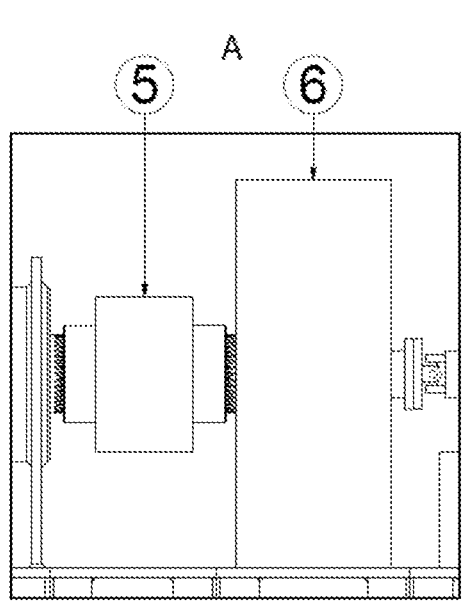
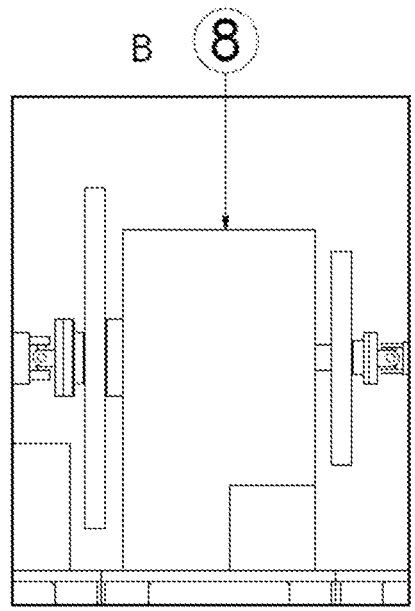
Figure 5B            Figure 5C
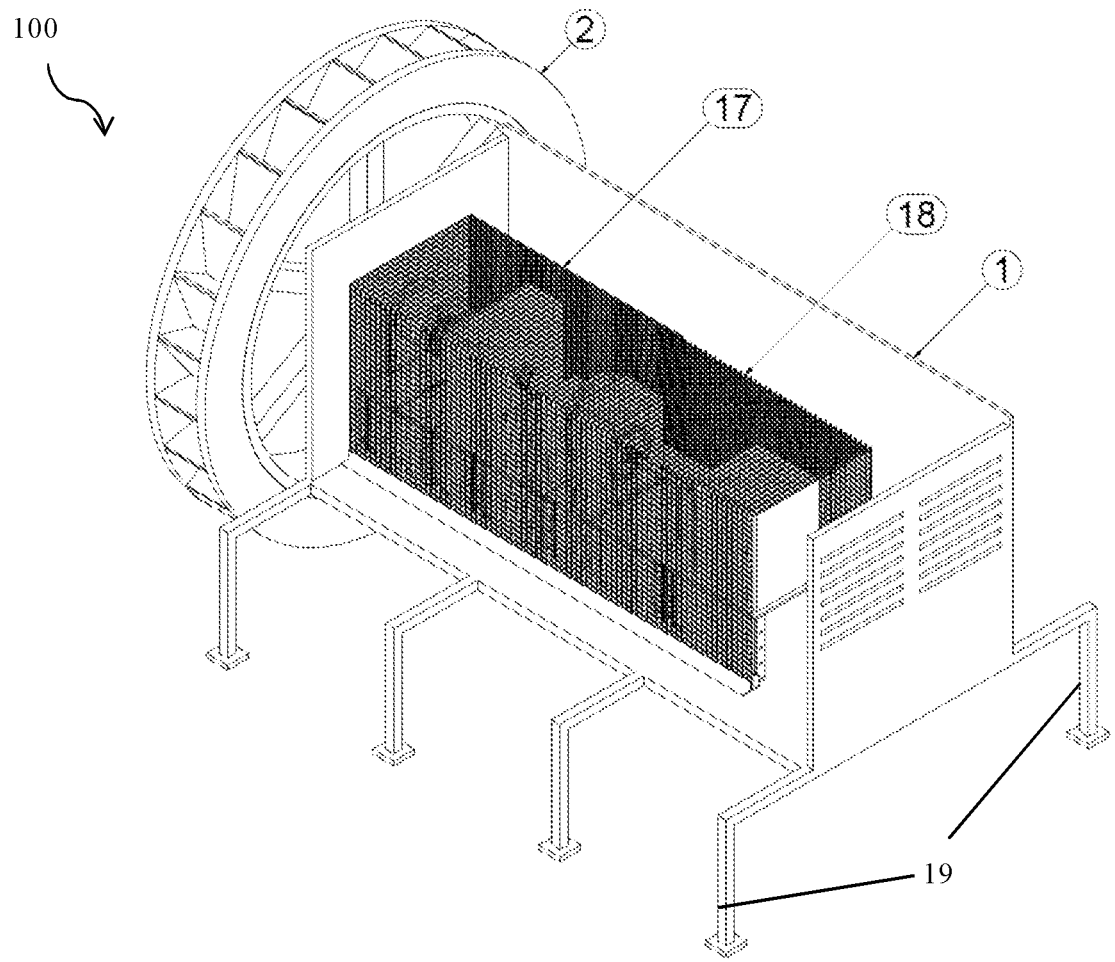
Figure 6

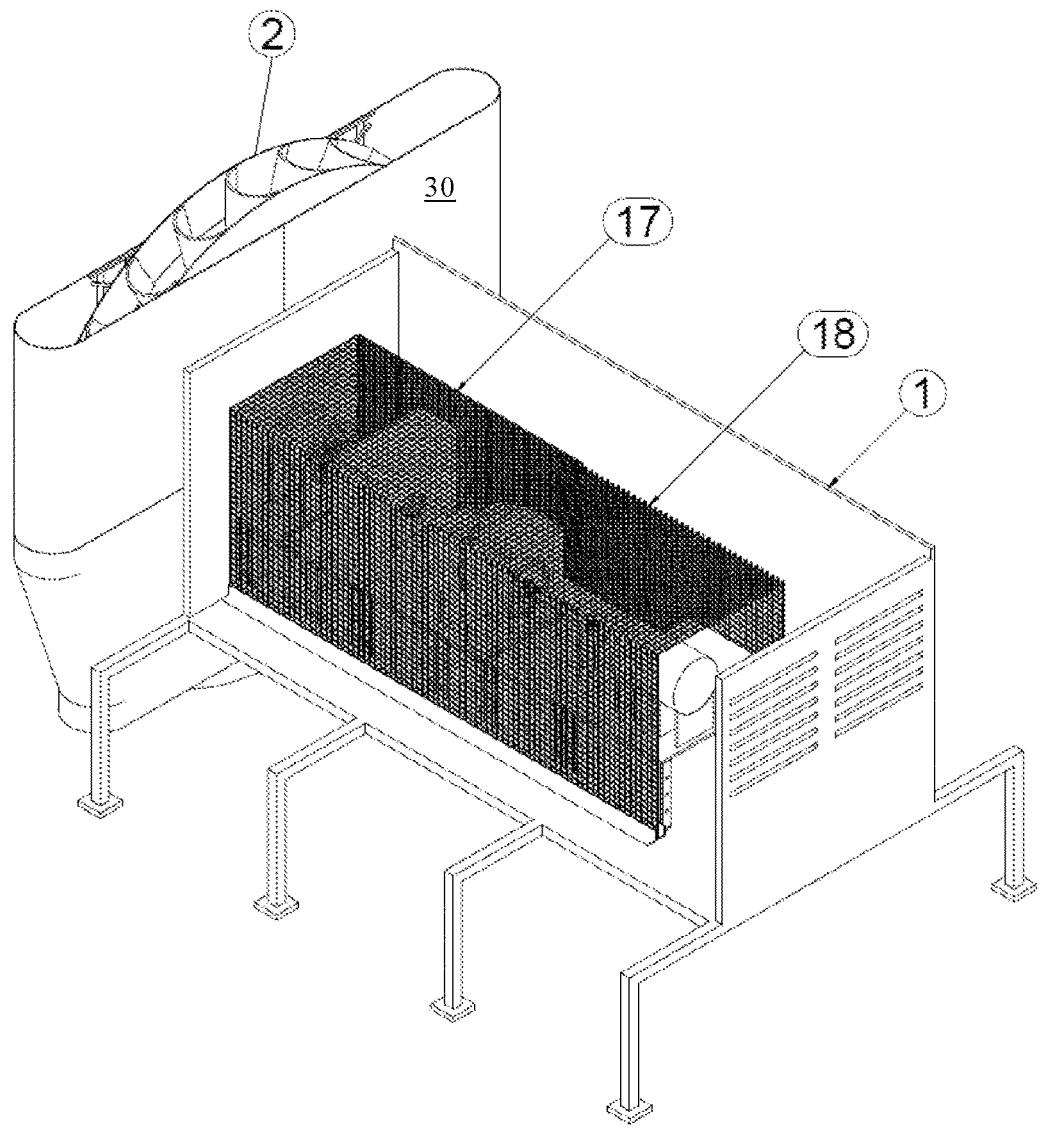
Figure 16
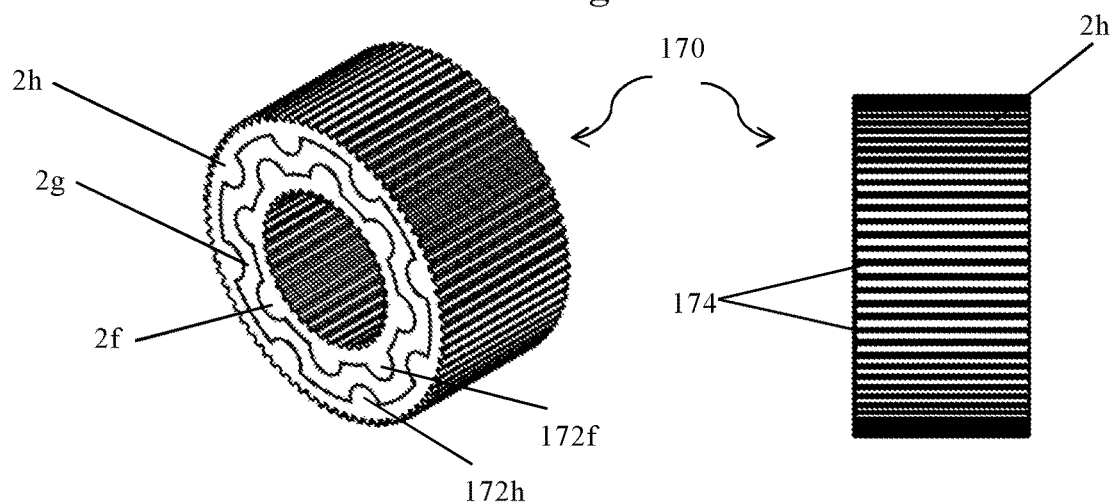
Figure 17  Figure 18

POWER GENERATING APPARATUS AND METHOD

The present invention relates to a capture wheel for use in power generating apparatuses and methods of generating power. More particularly, the invention may relate to power generating apparatuses and methods of generating power which are less harmful to the environment than currently used options (e.g. being non-polluting and/or not generating greenhouse gases) and which can be used in remote and isolated regions. Embodiments of the invention may have particular utility in remote and isolated working environments and work sites such, for example, mining work sites. The power generating apparatus may be mobile—i.e. it may be able to be moved between sites with relative ease. More particularly, the invention may relate to capture wheels which are adapted to receive falling rocks or other solid materials. Such wheels may be of particular utility on work sites such as, for example, mines or quarries, in which flows of falling solid material are often present. A power generating apparatus using such a capture wheel may be mobile—i.e. it may be able to be moved between sites with relative ease—or may be static—e.g. the wheel being mounted on a permanent structure such as a building.

Provision of power in remote and isolated work-sites, such as, for example, mines and quarries, typically requires fossil fuel power generation, either directly or indirectly. This may be seen as undesirable in the industry, and combustion products may be polluting and/or contribute to global warming. Work sites of particular relevance are, for example, oil sand deposits in the United Kingdom and United States of America, among other locations. It is desirable in the industry for there to be alternative means for generating power which do not rely on fossil fuels.

According to a first aspect, there is provided a capture wheel arranged to receive a solid falling material and to be caused to rotate by the solid falling material. The capture wheel comprises: a hub, the hub comprising a central core encapsulated in a layer of a resilient material; a wheel framework extending from the hub, wherein the wheel framework is connected to the layer of resilient material. In various embodiments, the wheel framework may be described as being mounted on the layer of resilient material. The wheel framework may be connected to the central core of the hub via the resilient layer of the hub—either directly, for example by inner ends of spokes of the framework being located and retained within the resilient layer, or indirectly, for example with the framework being rigidly connected to an outer support ring of the hub, with the resilient layer lying between the outer support ring of the hub and a central part of the hub. The resilient material may thereby serve to absorb some impacts, protecting the central core of the hub. In embodiments in which the hub (and more specifically the central core of the hub) is connected to, or comprises, one end of a shaft, which may be attached to a drivetrain, the resilient material may therefore shield the drivetrain from transferred impacts from falling material.

The capture wheel may further comprise a plurality of bucket sections mounted on the wheel framework and arranged to receive the falling material. The framework may space the bucket sections from the hub, and may form the majority of the radius of the wheel, extending between the central hub and the peripheral buckets.

The capture wheel may be arranged to drive a generator so as to generate electricity.

The falling material may be a solid, mineral material. The capture wheel may be adapted to handle impacts from the solid, mineral material.

The bucket sections (also referred to as buckets) may be detachably connected to the wheel. The bucket sections may be made of, or lined with, a shock-absorbent material such as rubber matting. Each bucket section may be a hammock-shaped rubber or polymer composite bucket suspended between front and rear faces of the wheel.

The central core may be made of metal, for example an alloy such as steel. The central core may be made from stainless steel. The wheel framework may be at least partially made of aluminium.

The wheel may comprise an outer ring/rim. An outer surface of the outer ring may comprise a layer of a shock-absorbent material.

The hub may comprise an outer support ring connected to and surrounding the resilient layer. The wheel framework may be connected to the outer support ring, and thereby to the resilient layer. The outer support ring may be made of a metal or alloy, such as steel.

The resilient layer may be made of a polymeric material, such as a polyurethane, polyamide, or nylon. The resilient layer may be made of rubber.

The resilient layer may have a thickness of 10-20 cm. The resilient layer may have a thickness of 40-50% of the hub radius. The resilient layer may be selected to compress by less than 5% of its thickness, optionally by 0.5% to 5% and further optionally by 1% to 4%, under expected loads. The resilient layer may have a Bashore Rebound test value of greater than or equal to 40% (optionally 40-95%), and optionally greater than or equal to 60% (optionally 60-95% or 70-95%, and optionally greater than or equal to 75%). The resilient layer may have a Shore A hardness of 75-100, optionally of 90-100, and further optionally of 95-98.

The framework may comprise a plurality of cross-radial struts extending between the hub and a rim of the capture wheel. Each cross-radial strut may be arranged to flex to allow relative radial movement between the rim and the hub (e.g. movement of the rim towards the hub on one side of the wheel, so reducing the local radius of the wheel). Each cross-radial strut may comprise a pair of arms extending from the hub to the rim, and a damper. The two arms may cross at a crossing point. The damper may be connected between the arms, at a position spaced from the crossing point of the arms. The damper may serve to limit relative rotation of the arms (and therefore length change of the cross-radial strut) and thereby to limit radial movement between the rim and the hub. The two arms may be rotatably connected together at the crossing point.

The framework may comprise a plurality of radial struts extending between the hub and a rim of the capture wheel. Each radial strut may be arranged to allow relative transverse movement between the strut and the rim (i.e. movement perpendicular to a face of the wheel). Each radial strut may be arranged not to flex to allow relative radial movement between the rim and the hub under expected impacts (therefore being effectively rigid).

According to a second aspect, there is provided an energy-generation apparatus arranged to be positioned below a falling material and to generate electricity from the falling material. The energy-generation apparatus comprises: a mounting structure; a capture wheel mounted on the mounting structure, wherein the capture wheel is as described in the preceding aspect; and a generator arranged to be driven by rotation of the capture wheel to generate electricity.

The mounting structure may be a transportable housing, and may be cuboid in shape. The generator may be located within the mounting structure.

According to a third aspect, there is provided an energy-generation method for generating electricity from falling solid material. The energy-generation method comprises obtaining a capture wheel as described in the first aspect, or an energy generation apparatus as described in the second aspect, the capture wheel being positioned below a location of a flow of falling solid material such that the capture wheel receives the falling material and is caused to rotate thereby; and generating electricity using a/the generator arranged to be driven by rotation of the capture wheel.

The obtaining the capture wheel may comprise obtaining a transportable housing, positioning the transportable housing such that the capture wheel can be arranged to receive the falling material and be caused to rotate thereby, and mounting the capture wheel on the transportable housing. The mounting of the wheel may be performed before or after the positioning of the housing.

The inventor appreciated that impacts from falling solid materials generally differ from water impacts and that a capture wheel could be adapted away from more traditional waterwheel-type designs to better accommodate impacts from solid materials. The inventor realised that adapting the wheel to include a dual-mass hub, with a resilient layer, would allow the wheel to absorb some of the impact energy so reducing damage to the buckets and wheel, and potentially improving wheel longevity.

As used herein, the term "capture wheel" means any body that is arranged to be caused to rotate by a flow of material, so at least temporarily "capturing" the material (e.g. on a paddle or in a bucket), and "capturing" some of the gravitational potential energy of the material. The body may be more cylindrical than disc-shaped, and may have a width greater than its diameter. Alternatively or additionally, the body may not be circular in cross-section, for example being polygonal instead, or even provided by a series of struts extending from a rotating hub without any connecting face or rim extending between or across the struts.

The term "resilient" takes its standard definition in the context of an object or material, meaning able to return to an original shape after bending, stretching, or being compressed. Resilient materials may therefore be used to withstand, or to allow an object to recover from, impacts. The dual-mass boss formed by the central hub core and the resilient layer may therefore absorb some (or all) of the energy of impacts. The skilled person would appreciate that some energy absorption would reduce the amount of energy available for conversion into kinetic energy of the wheel (and thereby optionally electrical energy), but that the benefits of the more tolerant wheel design—optionally with a longer apparatus life-span and/or lower maintenance requirements—may offset this reduction in terms of overall apparatus utility.

According to a further aspect of the invention, there is provided an energy-generation apparatus for generating electricity from falling material, the energy-generation apparatus comprising: a transportable housing; a capture wheel mounted on the housing, wherein the capture wheel is arranged to receive the falling material and to be caused to rotate by the falling material; and a generator located within the transportable housing, the generator being arranged to be driven by rotation of the capture wheel to generate electricity. The energy-generation apparatus is arranged to be placed below a flow of the falling material to generate electricity therefrom—the skilled person would appreciate that a portion of the apparatus (being or including a part of the wheel, and/or a chute arranged to direct material onto the wheel) may be directly beneath the falling material whereas the rest of the apparatus may be adjacent the flow of falling material. The transportable housing may be cuboid in shape.

The capture wheel may be as described in any preceding aspect.

The transportable housing may be or comprise a shipping container. The apparatus may be arranged to fit entirely within the housing for transportation—any parts of the apparatus external to the housing in use may be designed to fit within the housing when packed away. Any parts of the apparatus external to the housing in use may be designed to be mounted on the housing for use.

The transportable housing may be cuboid in shape. The transportable housing may have a height between 120 cm and 300 cm. The transportable housing may have a width between 120 cm and 300 cm. The transportable housing may have a length between 300 cm and 2000 cm, and optionally between 600 cm and 2000 cm.

The falling material may be solid—the capture wheel may therefore be arranged to receive a falling solid material, such as a mining material.

The capture wheel may be mounted on a wheel shaft. The wheel shaft may pass through a wall of the housing. The capture wheel may be located outside of the housing in use. The capture wheel may be linked to the generator located within the housing via (directly or indirectly) the wheel shaft.

The capture wheel may be arranged to be connected to the generator via a gear train. The gear train may allow the rotor of the generator to rotate at a different, optionally higher, speed from that of the wheel.

The gear train may comprise a first set of gears. The first set of gears may connect a first shaft driven by the capture wheel (optionally the wheel shaft, although an intermediate shaft may be present in some embodiments) to a flywheel shaft comprising a flywheel mounted thereon. The first set of gears may comprise a shaft disconnect arrangement, such as a free spool or clutch, arranged to allow the flywheel shaft to turn faster than the first shaft. The gear train may comprise two sets of gears. The flywheel may be located between the two sets of gears, in embodiments including a flywheel.

The gear train may be a step-up gear train arranged such that an input shaft to the generator rotates faster than the capture wheel.

The energy-generation apparatus may further comprise a plurality of supporting props arranged to extend downwardly from the transportable housing and to bear the weight of the transportable housing.

The falling material may be a solid, mineral material, such as mining material (e.g. rubble). The capture wheel may be adapted to handle impacts from the solid, mineral material.

The wheel may comprise buckets detachably connected thereto and arranged to receive the falling material. The buckets may be made of, or lined with, a shock-absorbent material such as rubber padding or matting.

The wheel may comprise a central hub and a framework extending therefrom. The hub may comprise a metal or metal alloy, for example stainless steel. The central core of the hub may be made of a metal or metal alloy, for example stainless steel. The framework may be made of, or comprise, a metal or metal alloy, for example aluminium. The central hub core may be encapsulated in a layer of a resilient material. The resilient material may extend between a central, metal part of the hub (the core) and the metal framework The wheel may comprise an outer ring. An outer surface of the outer ring may comprise a layer of a shock-absorbent material, such as rubber padding or matting.

According to a further aspect of the invention, there is provided an energy-generation method for generating electricity from a flow of falling material. The energy-generation method comprises:

obtaining an energy-generation apparatus comprising a transportable housing and a capture wheel, which may be as described in the first aspect, arranged to be mounted thereon;

positioning the energy-generation apparatus beneath the flow of falling material such that the capture wheel receives the falling material and is caused to rotate thereby; and generating electricity using a generator located within the transportable housing and arranged to be driven by rotation of the capture wheel.

The apparatus of the preceding aspect may be used to perform the method of this aspect. The transportable housing may be a shipping container.

The positioning the transportable housing such that the capture wheel receives the falling material may comprise mounting the capture wheel on the housing.

Embodiments of the invention may therefore provide, use, or include a capture wheel adapted to handle impacts from falling rocks or the likes, which would be likely to damage and destroy a non-adapted wheel. A power generator and method using such a wheel, suitable for use in isolated and/or remote regions, which do not require fossil fuel and which may additionally be easily moveable within a work-site or between different work-sites, are also disclosed.

The skilled person would understand that features described with respect to one aspect of the invention may be applied, mutatis mutandis, to the other aspect of the invention. For example, the capture wheel adapted to receive solid material may be used with or without the transportable housing, and the transportable housing may be used with any capture wheel design. There now follows, by way of example only, a detailed description of embodiments of the present invention with reference to the accompanying drawings in which:

FIGS. 5B and 5C are close-up views of gear train portions marked in FIG. 5A;

FIG. 6 is a cut-away perspective view of the apparatus of the embodiment of FIG. 4 additionally including a protective cage;

FIG. 16 is a perspective view of the wheel and hopper of FIG. 15 mounted as part of an apparatus of an embodiment;

FIGS. 17, 18 and 19 are perspective, side and front views of a wheel hub of various embodiments;

In the embodiments described herein, energy is generated from a feedstock falling under gravity. The feedstocks used in these embodiments are solid feedstocks, and more specifically rocky or mineral materials such as may be generated as byproducts in mining and/or quarrying activities. Examples are limestone, coal, crushed rock deposits, aggregates, shale, hydrocarbon shale, slate, and/or lower industry grade quarry materials. In alternative embodiments, other feedstocks may be used.

In the following, embodiments of the invention will be described in relation to the mineral material being a mined material, or a mined by-product material, and more specifically being a sand or sand-like material. The skilled person would appreciate that a material with a larger particle size than sand (e.g. rubble) could be used in various embodiments.

The skilled person would appreciate that waterwheel designs may not be suitable for use with solid feedstocks. In particular, the solid, mineral materials may have a devastating compound effect on a waterwheel, as is discussed in more detail below.

In the following, embodiments of the invention will be primarily described in relation to the capture wheel being mounted on a transportable housing. The skilled person would appreciate that a capture wheel of the same design may be mounted on any suitable structure (which may be termed a mounting structure), whether or not the structure is transportable and/or houses a generator or other apparatus to which the capture wheel is arranged to be connected. For example, the same capture wheel could instead be mounted on a wall or building. Likewise, the transportable housing may be used with a capture wheel as described in detail herein, or with another capture wheel. The transportable housing design and the capture wheel design may therefore be used separately, and may offer increased utility when used together.

Figure 1:
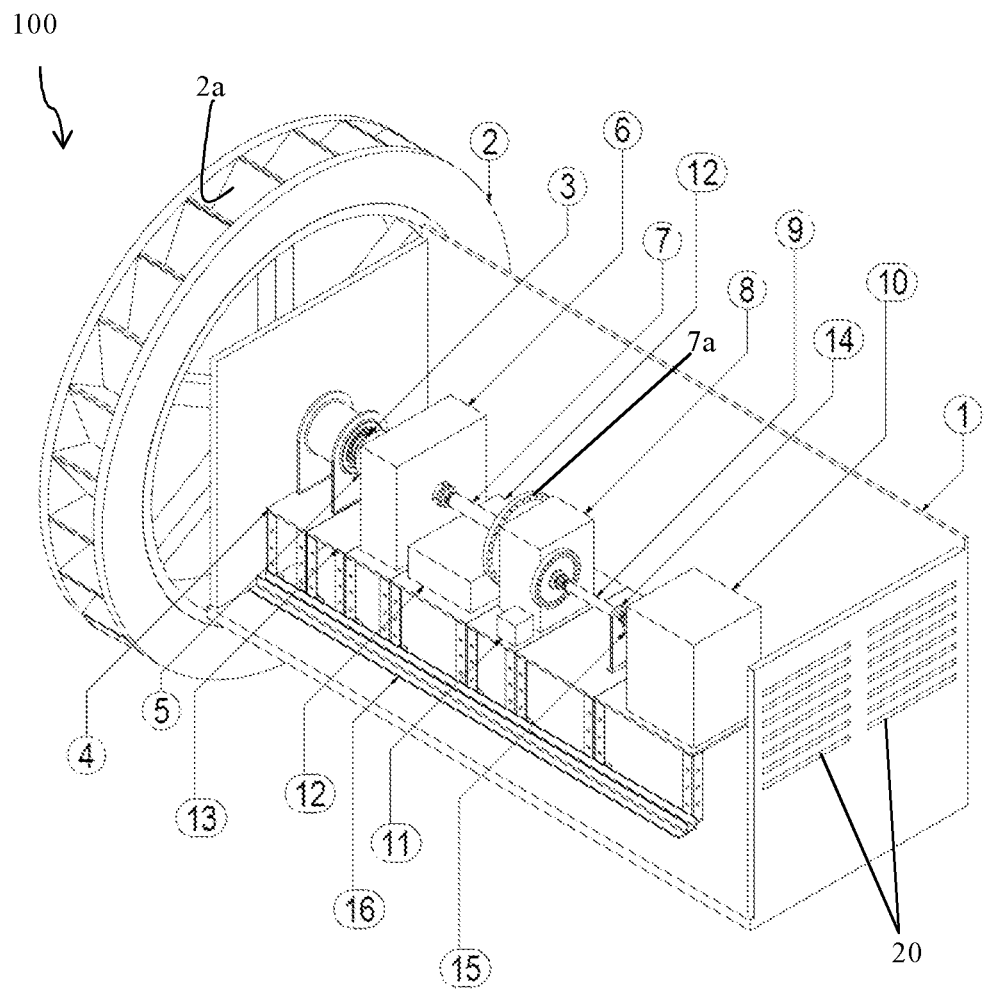
FIG. 1 is a cut-away perspective view of an apparatus of an embodiment.
Figure 2:
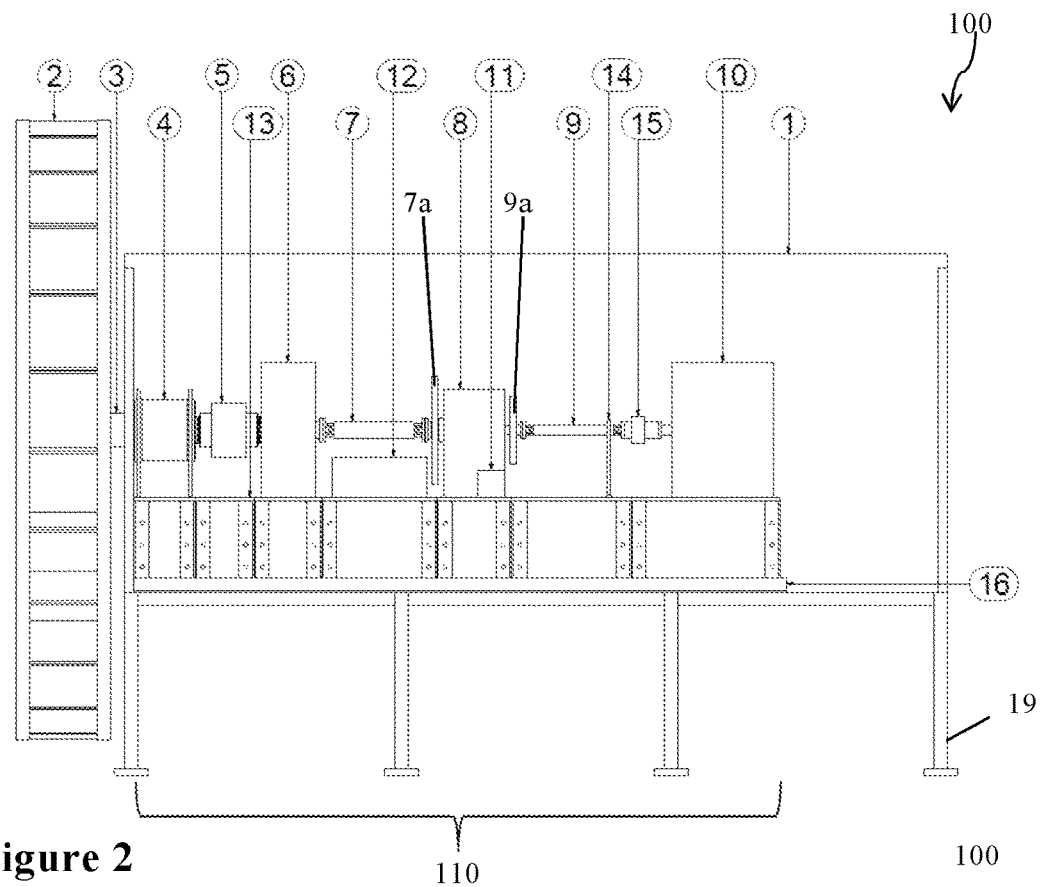
FIG. 2 is a cut-away side view of the apparatus of the embodiment of FIG. 1.
Figure 3:
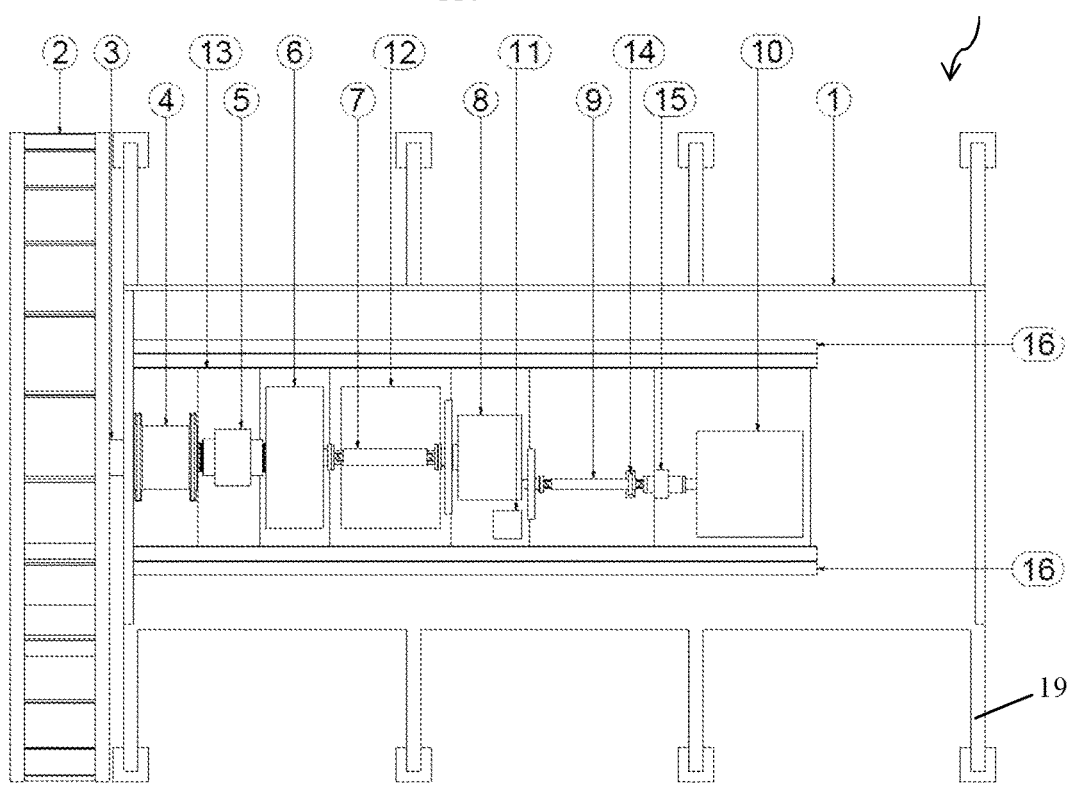
FIG. 3 is a cut-away plan view of the apparatus of the embodiment of FIG. 1.
Figure 4:
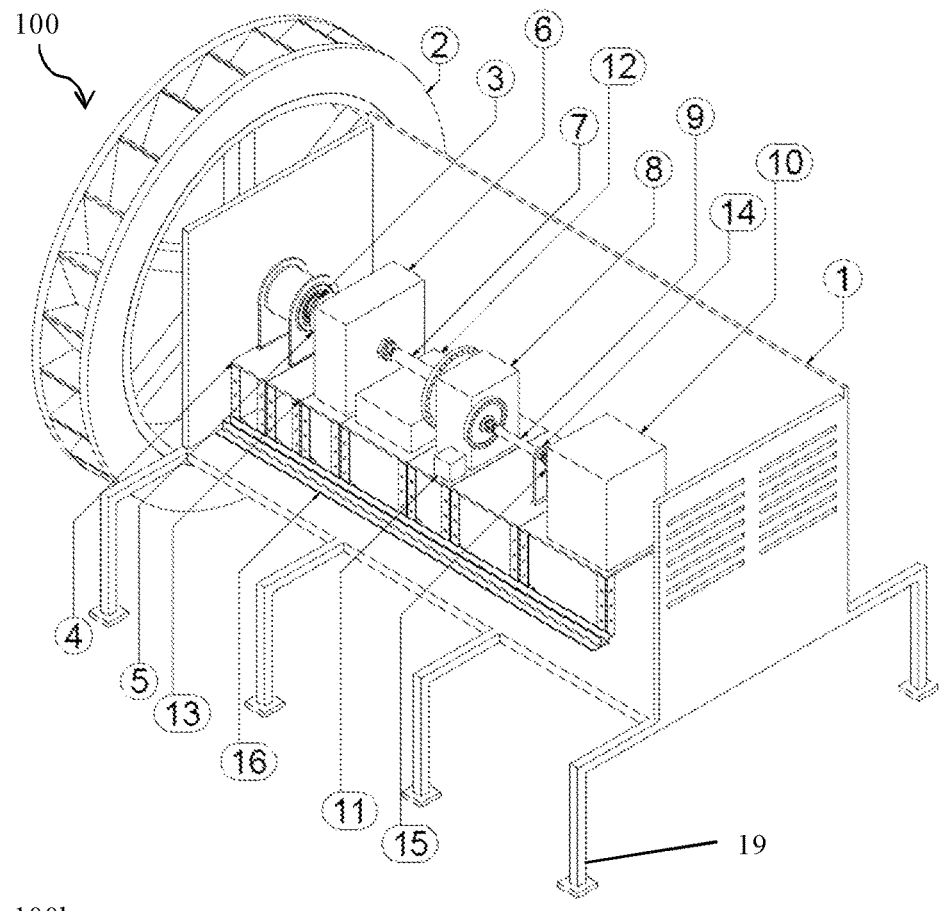
FIG. 4 is a cut-away perspective view of the apparatus of the embodiment of FIG. 1 mounted on a supporting frame.

FIG. 1 illustrates a power generation apparatus 100 of an embodiment. The power generation apparatus 100 comprises a housing 1. The housing 1 is a transportable housing 1. The housing 1 is selected such that the power generation apparatus 100 can be moved with no, or with only minimal, disassembly and reassembly. As used herein, "transportable" means capable of being moved by crane, truck/lorry, train, and boat (without disassembly of the housing 1).

In the embodiment being described, the housing 1 is at least substantially cuboid in shape, and at least substantially hollow. In the embodiment being described, the housing 1 is sized and shaped to allow access to one or more personnel within the housing 1, to access components of the apparatus 100 within the housing. In the embodiment being described, the housing 1 is sized and shaped such that any portions of the apparatus 100 located outside of the housing 1 in use may be accommodated within the housing 1 for transport.

In the embodiment being described the housing 1 is a shipping container 1, and more specifically is an ISO shipping container (i.e. intermodal (shipping) containers complying with standard ISO 6346:1995). The standard used to identify intermodal (shipping) containers is ISO 6346:1995. This standardised identification system is used to give each container type a unique marking. The code can be further broken up into three parts an ISO 6346 (BIC) code, a size and type code, and additional optional markings. In various embodiments of the invention, the housing 1 may be certified and receive its own type code within the general class of shipping containers of its size. ISO or intermodal containers 1 are used for the intermodal transport of freight. They are manufactured according to specifications from the International Organisation for Standardisation (ISO) and are suitable for multiple transportation methods such as truck, rail, or ship. These regulations define a shipping container 1 that meets size, strength, and durability requirements. The basis of these regulations is to guarantee that the container 1 can withstand extreme environments endured during transport as well as possess the structural integrity needed to be lifted by cranes or other heavy equipment.

Whilst other sizes and/or styles of housing 1 may be used in other embodiments, the skilled person would appreciate that the choice of an ISO unit may provide flexibility in use of pre-existing global infrastructure, potentially allowing the apparatus 100 to be readily deployed globally into multiple transportation networks with safety and using tried and tested, cost efficient, practices.

Dimensions of ISO shipping containers 1 are regulated by the International Standards Organisation (ISO). These regulations are intended to allow ISO containers to use space as efficiently as possible regardless of the method of transport. ISO containers are available in various sizes:

Height: "Standard" ISO containers measure 260 cm (8 ft. 6 in.) in height, but other ISO containers are available in several discrete heights measuring from 120 cm (4 ft.) to 290 cm (9 ft. 6 in.).

Containers that measure 290 cm (9 ft. 6 in.) tall are called "extended height" or "high cube" containers while 120 cm (4 ft.) and 122 cm (4 ft. 6 in.) containers may be called "half height" containers.

Width: The majority of ISO containers measure 2,438 mm (8 ft.) wide. ISO Containers that exceed this width are grouped into two other size ranges. C, D, E, and F identify containers that are greater than 2,438 mm wide, but less than 2,500 mm. Containers that exceed 2,500 mm in width are referenced by L, M, N, and P.

Length: The most common lengths are 610 cm and 1220 cm (20 and 40 ft.). Other lengths include 732, 853, 1341, 1372, 1402, 1615 and 1707 cm (24, 28, 44, 45, 46, 53, and 56 ft.). Shorter shipping containers are also available, such as lengths of around 305 cm (10 ft.). Such a container may, for example, have dimensions of length: 299 cm, width: 244 cm, height: 259 cm.

ISO containers 1 may be designed to accommodate gross weights of 30 tonnes or more, and often carry weights of up to 15 tonnes. In the embodiments being described, the apparatus 100 is arranged not to exceed a gross weight of 10 tonnes. In alternative embodiments, the apparatus 100 may be heavier whilst still falling below 30 tonnes.

ISO containers 1 are available with many special features. Some containers 1 are airtight and/or stackable. Others are designed for storing and moving flammable, corrosive, explosive, or other hazardous materials. Containers that are shielded against electromagnetic interference (EMI) and radio frequency interference (RFI) are often used in the transportation of electric and electronic products. Vented ISO containers with ducts along the side panels and top and bottom rails may be suitable for replacing warm, moist air within the container with colder and/or drier, ambient air.

The housing 1 of the embodiment being described is an ISO unit—the ISO unit 1 provides a structural component for the apparatus. In the embodiment being described, internal modifications and strengthening supports have been provided to the standard ISO unit 1, as described below, to support the components provided for electricity generation.

The skilled person would appreciate that the use of an ISO container 1 may facilitate scalability as well as transportation—for example, multiple units 100 may be stacked on top of each other. A modular ISO configuration is therefore facilitated; scaling the number of units 100 to match demand. Further, as each unit is self-contained, no, or minimal, assembly may be required on site (e.g. the wheel 2 may be shipped separately, or within the housing 1, and need to be mounted, but the apparatus 100 may otherwise be ready to operate).

In the embodiment being described, the independent ISO containers 1 are configured to allow a plurality of units 100 to be structurally linked together. A linked formation may enable increased capacity and functionality as compared to a single independent unit 100. For example, the ISO units may be attached in series: side-by-side, one on top of the other, and/or end-to-end. Such linkages may provide additional support for the position of each member of the formation, and may allow for capture wheel sizes to be increased. Some unoccupied housings 1 may be added in such a configuration; internal spaces may be utilised for placement of supporting systems and material maintenance components or the likes.

To facilitate standardised transportation of the apparatus 100, minimal changes may be made to the ISO container housing 1 externally.

ISO containers 1 comprise a frame with side, front and rear wall, roof and floor panels mounted thereon. The rear wall panel, or a portion of a side wall panel, may provide a door into the container 1. The frame generally comprises multiple beams across the lower face/floor of the container 1, the beams defining compartments therebetween (such as to provide fork pockets for ease of moving a container using a forklift).

In the embodiment being described, the frame of the housing 1 is internally reinforced or strengthened. In particular, in the embodiment being described the lower beamed compartments are reinforced, as these locations may provide support for stand-alone framed assemblies such as gearbox casings, bearing housings, flywheel to prop shaft drives, electrical generator equipment, and the likes, as described below. In addition, ancillary devices may require one or more of vertical frame bracing and/or subfloor attachment—attachment points may be provided for wheel segments and support props 19, for example, as described below.

In the embodiment being described, each end of the housing 1 is also reinforced (the front and rear faces of the housing 1). As described below, the front face accommodates the capture wheel 2 and the rear face is adjacent the generator 10. In particular, a centre bearing mount for the wheel 2 is located through a mid-section of the front face in the embodiment being described, and is reinforced to comply with applicable stress and load tolerances.

In still further embodiments, a non-transportable housing, or no housing at all, may be used. A wall, building, other permanent structure, or the likes may be used in place of a housing.

The power generation apparatus 100 comprises a capture wheel 2. The capture wheel 2 is arranged to capture the falling material, and to be rotated by the falling material—the loss of gravitational energy and/or kinetic energy of the falling material is converted to kinetic energy of the rotating wheel 2. The capture wheel 2 may also be referred to as a gravity capture wheel or a gravity feed wheel. The capture wheel 2 is mounted on the housing 1 in the arrangements being described, but may alternatively be mounted on a different structure.

In the embodiment being described, the capture wheel 2 is located outside of, and adjacent, the housing 1, and may therefore be described as an external wheel 2. In alternative embodiments, the wheel 2 may be mounted within the housing 1—in such embodiments, two openings through the housing 1 may be provided; one at the top for the material to reach the wheel 2, and one underneath for the material to leave the wheel 2. One or both openings may be shaped to guide the falling material in such embodiments. The openings may be sealable—for example being provided with a hatch or sliding cover—for example for ease of transportation.

In the embodiment being described, the ISO housing 1 therefore supports a gravity feed external wheel 2 when in situ for operation. The skilled person would appreciate that choices of dimensions and materials for the housing 1 and wheel 2 may be made according to the intended purpose and available feedstock.

In the embodiment being described, various grades of aluminium and steel were used to provide sufficient strength for a relatively low weight. In the embodiment being described, the housing 1, a central support boss/hub 2f of the wheel 2 (which may also be referred to as a core 2f of the hub) and interchangeable bucket sections 2a arranged to be located around the circumference of the wheel 2 are made of steel and other wheel components are made of aluminium. In alternative embodiments, all components of the capture wheel 2 except the resilient layer 2g may be made of steel.

The central hub 2f of the wheel 2 is made of metal and is surrounded by a layer 2g of a resilient material. The central hub 2f is relatively rigid as compared to the resilient layer 2g.

The central hub 2f may be thought of as forming the core of a dual-mass boss/hub comprising the core 2f and the layer 2g of resilient material. The resilient material is a polymeric material, such as polyurethane, nylon, polyamide, or rubber, in the embodiments being described. In the embodiment being described, the steel central hub 2f (the core) is encapsulated in a resilient material such as polyurethane 2g which may assist with shock absorption, as described below. Composite materials may be used in some embodiments.

The layer 2g of resilient material may have a thickness of around 20-60% of the hub radius, optionally around 40-50% of the hub radius, and optionally around 45% of the hub radius. Additionally or alternatively, the layer 2g of resilient material may have a thickness of around 2-10% of the wheel radius, and optionally around 5-6% of the wheel radius.

In the embodiment being described, the resilient layer 2g is selected to compress by less than 5% of its thickness, optionally by 0.5% to 5% and further optionally by 1% to 4% of its thickness, under expected loads. The skilled person would appreciate that a stiffer material may therefore be selected for the resilient layer 2g when the wheel 2 is intended to be used with more forceful impacts (e.g. a higher head-height of the falling material, and/or a larger average size of falling material). Suitable materials may include A95 or D60/65 KAYLAN™'A' Series polyurethane grades, with a Bashore Rebound test value of 40-45%. Suitable materials may have a Bashore Rebound test value of 30-95%, optionally over 40%, optionally 60% or greater, and further optionally over 75%. Suitable materials may have a Shore A hardness of 75-100, optionally 90-100, and further optionally 95-98.

In the embodiment being described with respect to FIGS. 1 to 6, the capture wheel 2 has a diameter of 240-290 cm (8-16 feet) and a depth of 30-60 cm (1-2 feet). The skilled person would appreciate that sizes may differ in other embodiments, for example based on housing size and/or strength, feedstock type, feedstock fall height, and the likes.

In the embodiment being described, the capture wheel 2 is arranged to be disassembled into two pieces. In alternative embodiments, the capture wheel 2 may be arranged to be disassembled into two or more pieces, for example two to six pieces or two to four pieces. The skilled person would appreciate that disassembly of the wheel 2 may facilitate transportation. The wheel segments may therefore be packed inside the housing 1 for transportation, even in embodiments in which the wheel diameter is larger than the housing height and/or width. In embodiments in which the wheel 2 has a smaller diameter such that the wheel 2 could fit within the housing 1 in one piece, or in which the wheel 2 is not designed to be used as part of a transportable apparatus 100, the wheel 2 may or may not be disassemblable. The packaged apparatus 100 may therefore remain in compliance and conformity with the standards for a single shipping container 1.

An overshot wheel configuration is generally preferred in the embodiments being described, to reduce the risk of the feedstock material jamming the wheel 2 as compared to undershot or pitchback designs (the skilled person would appreciate that mineral feedstock materials are unlikely to flow as smoothly or evenly as water, and can get lodged within a structure, and that jamming is therefore more of a concern than it would be for a water wheel).

In the embodiment being described, the wheel 2 is adapted to receive and handle mineral materials, and capture the gravitational energy from the falling mineral materials to generate electricity.

In various embodiments, the capture wheel 2 may take any suitable form known in the art—for example being a bucket wheel 2. In the embodiment being described, the capture wheel 2 is a bucket wheel 2—the wheel 2 comprises a plurality of buckets 2a arranged around the circumference of the wheel. The buckets, or bucket sections, 2a are arranged to be detachable/replaceable. In alternative embodiments, receptacles for the falling feedstock may be integral with the wheel 2, and may not be detachable. The buckets 2a of the embodiment being described have a non-negligible depth and are arranged to contain a portion of the material until the wheel 2 rotates far enough for the material to be tipped out. Capturing the falling material in this way may help to guide the falling material to a desired location and reduce the risk of rocks or the likes bouncing off the wheel 2. In alternative embodiments, the bucket section 2a may be panels or paddles with a negligible or zero depth.

The skilled person would appreciate that mineral or geological materials may have a relatively high density as compared to water, and/or a relatively large particle size, and that impacts on the wheel 2 may be much greater, and/or distributed over a narrower bucket area due to sharp edges of rubble or the likes. Being able to remove and replace damaged buckets 2a with relative ease may therefore improve the longevity of the wheel 2.

Further, the capture wheel 2 is designed to have an improved ability to accommodate shock load as compared to standard capture wheels 2. In the embodiments being described, the wheel 2 has more central aluminium framing as compared to known designs, wide but shallower capture sections (buckets 2a), and incorporates padded rubber compartments.

In the embodiment being described, the central hub/core 2f of the wheel 2 is made of steel, and more specifically of stainless steel. In other embodiments, the core 2f may be made of a different metal, such as aluminium. In the embodiment being described, the core 2f of the wheel 2 is encapsulated in a resilient polymeric layer 2g (e.g. a polyurethane-based composite material). The resilient layer 2g around the core 2f is arranged to provide support in connecting the wheel framework (the struts 2d, 2e and outer ring 2b) to the centre hub/core 2f, and may redirect impact shock away from the drivetrain components. (In embodiments with a non-circular capture wheel, the outer ring 2b may also be non-circular, and may be more generally referred to as an outer rim.) In particular, the resilient layer 2g may cushion the connections between the struts/spokes and the hub, allowing for some relative movement to absorb impact. The only connection(s) between the struts/spokes 2d and the core 2f may be via the resilient layer 2g. The central hub 2f and resilient layer 2g together form a dual mass support boss 2f, 2g at the centre of the wheel 2.

In the embodiment being described, the resilient layer 2g lies between an outer radius of the metallic part of the hub 2f and the connecting wheel framework 2d, 2e. The wheel framework 2d, 2e is relatively rigid as compared to the resilient layer 2g. The resilient layer 2g may be thought of as extending the hub 2f. The resilient layer 2g may have a thickness of between 5 cm and 30 cm, and optionally may be around 20 cm thick. Inner ends of the spokes 2d, 2e of the framework may be received within the resilient layer 2g, or may be connected to an outer surface of the resilient layer 2g. The layer 2g is described as resilient because it is designed to absorb some of the impact on the wheel 2, which is relayed through the framework 2d, 2e to the hub 2f. The spokes/struts 2d, 2e may be arranged to move inwards towards the hub 2f, for example by a distance equivalent to 2-3% of the thickness of the resilient layer 2g, against the resistance of the resilient layer 2g, when struck with sufficient force, so cushioning the central hub 2f and potentially reducing or avoiding the transmission of damaging forces to other apparatus components (where applicable). Some or all of the absorbed energy of the impact may be dissipated as heat. The resilient layer 2g is arranged to return to its original shape and thickness once the impact force reduces. In various embodiments, the material (e.g. polymer or polymer blend) used for the resilient layer 2g, and/or the thickness of the resilient layer 2g, may be changed or adjusted based on the expected impacts, feedstock, wheel design, expected torque and the likes.

In the embodiment being described, the outer ring 2b of the wheel is additionally lined or coated with a layer of a resilient material, such as rubber padding or matting, which may cushion debris impact. The outer ring 2b may therefore be referred to as a composite outer ring. In other embodiments, there may be no such resilient layer on the outer ring 2b.

In the embodiment being described, the buckets sections 2a are constructed in metal sheets (e.g. stainless steel sheets or sheets of a different metal or alloy), or an open mesh material (e.g. a metal mesh, such as a stainless steel mesh). In alternative embodiments, the buckets 2a may be made of a composite material, and/or or a polymeric (e.g. a polymer composite) or rubber material, and may for example take the form of hammocks, for example hanging between, and connected to, two faces of the wheel 2. In the embodiment being described, the sheets, mesh or other material forming the buckets 2a may be between 6-20 mm, and optionally between 6-10 mm thick; a width may be selected based on the choice of metal or alloy, bucket design, and/or expected feedstock properties. In the embodiment being described, the buckets 2a are made entirely of stainless steel materials. In alternative embodiments, other metals or alloys and/or composite materials may be used instead of, or as well as, steel. For example, composite materials (such as an epoxy-based polyurethane mix) may be used by moulding the material to produce buckets 2a.

In the embodiment being described, the bucket sections 2a are arranged to accommodate, or be lined with, a shock-absorbent material such as heavy rubber matting. The matting may be selected to be relatively dense, for example being produced by a laminating process creating a strong woven material. The matting may be at least 2 mm, and optionally at least 5 mm, thick.

The shock-absorbent material may absorb some of the energy of the impact from falling material, so reducing impact vibration and/or environmental noise, and potentially reducing damage to the underlying bucket 2a. The material may be a resilient and/or flexible material. The material may also serve to spread an impact across a wider area of the bucket 2a, so potentially reducing deformation or cracking of the bucket 2a. In alternative embodiments, no such liner may be used. In such embodiments, the buckets 2a themselves may be made of rubber or another resilient material. The skilled person would appreciate that shock-absorbing and/or noise-reducing buckets 2a may be produced in various ways, and that the examples provided above are not intended to be limiting.

In the embodiment being described, the buckets 2a are mounted to the wheel 2 at bucket mounting points located on the outer ring 2b of the wheel 2. The bucket mounting points of the embodiment being described comprise polyurethane bushes. The skilled person will appreciate that various strain/compression grades of polyurethane bushes are available, and a relevant grade may be selected as appropriate for the wheel 2, bucket 2a, and intended feedstock.

In the embodiment being described, the wheel 2 comprises a central hub 2f with struts, or spokes 2e, 2d, radiating out from the hub 2f to the circumference of the wheel 2. The framework of the wheel 2 (struts 2d, 2e and outer ring 2b) is made of a metal or alloy in the embodiment being described. In the embodiment being described, the framework of the wheel comprises two sets of struts 2d, 2e. A first, main, set of struts 2*d* comprises four struts 2*d* spaced apart by 90° around the circumference of the wheel. A secondary set of struts 2*e* comprises two struts 2*e* evenly spaced between each adjacent pair of main struts 2*d*. The main struts 2*d* are thicker and stronger than the secondary struts 2*e* in the embodiment being described. In the embodiment being described, a main frame support 2*d* (the first set of struts) is made of steel and a secondary frame support 2*e* (the secondary set of struts) is made of aluminium. In alternative embodiments, only a single set of struts may be provided, more than two differing sets of struts may be provided, and/or a solid disc or the likes may be provided instead of struts.

In the embodiment being described, aluminium was selected in preference to steel for the secondary struts 2*e* as the stainless steel grades needed to provide an equivalent resistance to environmental exposure would increase wheel weight. As the wheel 2 may be intended to be manually handled in some embodiments (e.g. disassembly into segments for transport, and reassembly on site, for transportable arrangements), a reduction in weight may be beneficial. The detachability of the buckets 2*a* in the embodiment being described may also improve ease of manual handling.

In the embodiment being described, the wheel 2 comprises a mesh cover 2*c* covering the spokes 2*d*, 2*e*. The mesh 2*c* takes the form of a disc in the embodiment being described, and may be detachable into segments (e.g. quadrants) for ease of packaging and transportation. In embodiments such as the one being described, in which one side of the wheel is adjacent a housing 1 or other mounting structure, a single mesh cover 2*c* is provided and intended for use on the side of the wheel 2 not adjacent the housing 1. In other embodiments, a mesh cover 2*c* may be provided for each side of the wheel 2. The mesh 2*c* may reduce the chance of anything become trapped in the spokes 2*d*, 2*e* and dragged around by the wheel 2, or jamming the wheel 2. In some embodiments, no mesh may be provided, or a non-mesh cover (e.g. a solid plate) may be provided in its place.

In the embodiment being described, the apparatus 100 does not comprise a conveyer belt or any other component arranged to move the feedstock material. The wheel 2 is arranged to be moved by the falling material (and is likely to deflect the material from the vertical path it would otherwise have taken in the process). A chute or hopper 30 may be provided above and/or around the wheel 2 to direct the material towards the wheel 2 in some embodiments, for example if the wheel 2 is narrower than a conveyer belt under which the apparatus 100 is to be placed. The hopper 30 may be mounted on the housing 1, or on an object in the surrounding environment, e.g. on a mount for a conveyer belt. The wheel 2 (and optionally a portion of the wheel shaft 3) is the only moving part of the apparatus 100 outside of the housing 1 in the embodiment being described. In alternative embodiments, a conveyer belt or the likes may be integrated with the apparatus 100.

Figure 15:
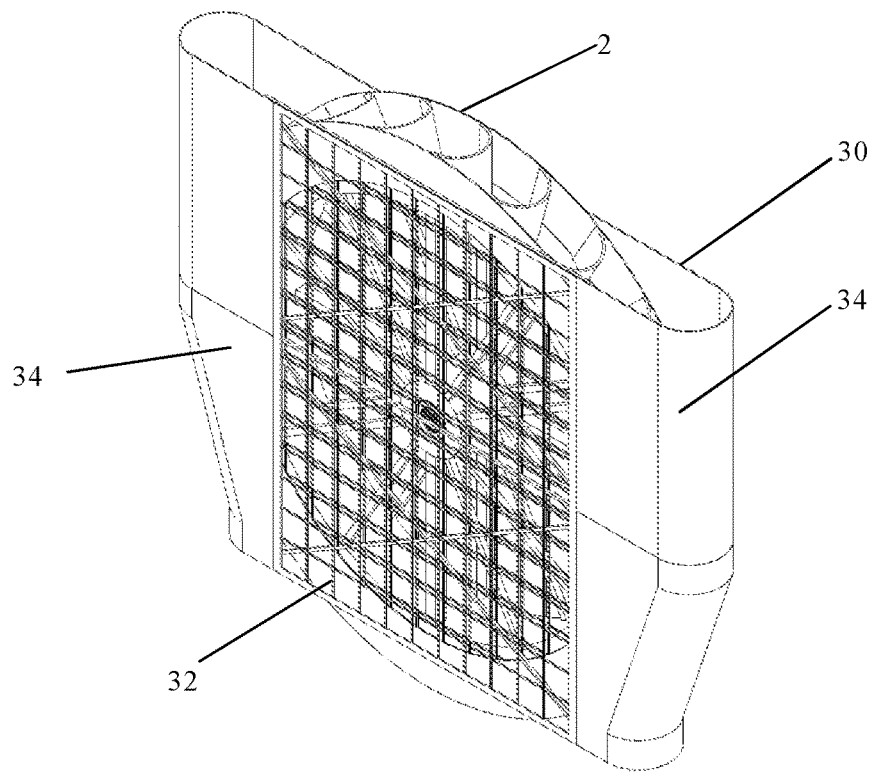
FIG. 15 is a perspective view of the wheel of FIGS. 14A-C with a hopper mounted thereon.
Figure 19:
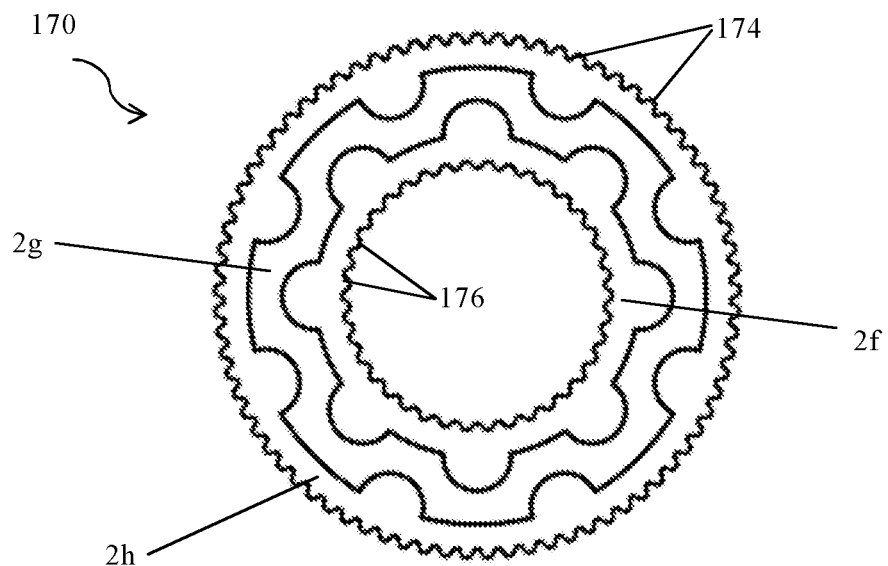

In the embodiment shown in FIG. 15, a hopper 30 is provided which surrounds and at least partially encloses the wheel 2. In alternative embodiments, a hopper 30 may lie mainly or completely above the wheel 2, and may not enclose the wheel. The skilled person would appreciate that having an enclosure around the wheel 2 may improve safety. In still further alternative embodiments, no hopper may be provided.

In the embodiment being described, the hopper 30 is symmetrical about a vertical line—the hopper 30 may be used to receive and guide a flow of material on either side of the wheel 2. In embodiments with rubber buckets 2*a* or the likes, the buckets may be flexible/reversible (e.g. bending) to accommodate clockwise or anti-clockwise rotation. In alternative or additional embodiments, the buckets 2*a* may be rotatably mounted to the wheel 2, or the wheel 2 may be mountable on the housing 1 in two different positions, and/or detachable buckets 2*a* may be attachable in two different positions, to accommodate clockwise or anti-clockwise rotation. Some flexibility may therefore be provided for relative locations of the housing 1 and the flow of falling material.

In the embodiment being described, the hopper 30 comprises a central mesh portion 32 between two more solid-walled guide channels 34. The guide channels 34 each enclose one side of the wheel 2 and the mesh portion 32 extends across the wheel's face. The use of mesh may reduce weight and/or improve ease of view in case of faults or blockages. In use, only one of the two guide channels 34 is generally in use at any one time. In other embodiments, an asymmetric hopper 30 arranged to provide only a single guide channel 34 may be used and mounted to guide flow on the appropriate side of the wheel 2.

FIG. 16 shows the wheel 2 and hopper 30 described above mounted on a housing 1 for use. The hopper 30 of the embodiment being described has a solid rear surface (adjacent the housing).

In the embodiment being described, the hopper 30 narrows towards the bottom of the wheel 2, guiding the falling material to a relatively small region beneath the wheel 2 (e.g. onto a conveyer belt). The hopper 30 may prevent material falling from or past the buckets 2*a* (e.g. being deflected from a corner of a bucket) and striking nearby objects or people.

In the embodiment being described, the hopper 30 is arranged to be packed within the housing 1 for transport. The hopper 30 is arranged to be disassembled into multiple parts for ease of moving and packing in the embodiment being described.

In the embodiment being described, the capture wheel 2 is mounted on a wheel shaft 3. In the embodiment being described, the capture wheel 2 is detachably connected to the wheel shaft 3—the wheel 2 may therefore be removed, e.g. for ease of transportation or for replacement if damaged. In alternative embodiments, the wheel shaft 3 may be integral with the capture wheel 2.

In the embodiment being described, the hub of the wheel 2 is splined—an end of the wheel shaft 3 arranged to be connected to the wheel 2 is also splined, and the splines fit together to prevent relative rotation between the wheel 2 and the wheel shaft 3. Rotation of the wheel 2 therefore rotates the wheel shaft 3 in use.

In the embodiment being described, a bolt and spigot connection is provided to prevent axial sliding of the wheel 2 relative to the wheel shaft 3 in use. The skilled person would appreciate that any suitable connector known in the art may be used in other embodiments.

The wheel shaft 3 may be described as an input drive shaft, as it provides the input to the energy generation apparatus 110 within the housing 1. The wheel shaft 3 is arranged to rotate with the capture wheel 2.

In the embodiment being described, the wheel shaft 3 passes through a hole in the housing 1, thereby mounting the wheel 2 on the housing 1. The wheel 2 may therefore be mounted on the housing 1 by the wheel shaft 3.

In the embodiment being described, the wheel shaft 3 is centrally mounted on a face of the housing 1. In the embodiment being described, the wheel 2 has a diameter, A, larger than a height of the housing 1. As the wheel 2 has a diameter, A, larger than a height of the housing 1 and is centrally mounted on the housing, the wheel 2 extends below a lower face of the housing 1. To facilitate deployment of the apparatus 100 without needing to build a platform or find a raised area on which to rest the housing 1, supporting props 19 are therefore provided. In alternative embodiments, the wheel shaft 3 may not be centrally mounted, and/or the diameter, A, may be smaller/the structure on which the wheel 2 is mounted may be taller.

In the embodiment being described, the external structure of the apparatus 100 features supporting props 19, and more specifically adjustable stability props 19 arranged to bear the weight of the housing 1, allowing the housing 1 to be supported above the ground or other surface on which the apparatus 100 rests. The skilled person would appreciate that supporting props 19 of the design shown in FIGS. 2 to 5, which extend away from and downward from edges of the lower face of the housing 1, may be particularly suitable when one unit 100 is operated independently (not stacked with others).

The supporting props 19 of the embodiment being described are adjustable in that the height of each "leg" 19 may be adjusted independently of the other legs—this may allow rough terrain, such as is often present in mines and quarries, to be compensated for, making the housing 1 level. In alternative embodiments, the supporting props 19 may not be adjustable, and may instead all have a fixed length.

The supporting props 19 of the embodiment being described are designed to be accommodated within a lower portion of the standardised ISO subframe by locking into the standardised framework; the housing 1 may therefore remain unchanged externally. In the embodiment being described, the housing 1 is strengthened internally to facilitate use of the props 19.

In the embodiment being described, the supporting props 19 are detachable from the housing 1 and may be transported packaged within the housing 1. In alternative embodiments, the supporting props 19 may be integral with, or permanently connected to, the housing 1. In such embodiments, the supporting props 19 may be retractable into the housing 1 to facilitate transportation and/or stacking.

In various embodiments, some or all of the props 19 may be mechanised, for example being electrically, pneumatically, and/or hydraulically powered. Mechanised props may be used to lift the housing 1, which may facilitate positioning the housing 1 for attachment of the wheel 2, and/or loading and unloading of the housing 1 onto vehicles or the like. The housing 1 may therefore be a self-lifting container in some embodiments. Optionally, additional props may be added for stability once the mechanised props have positioned the housing 1. The mechanised props may be powered by an external power source (e.g. a generator or battery pack), or by an internal power source (e.g. electricity supplied by one or more batteries located within the housing 1, optionally housed between floor rails 16 of the housing 1). Movement of the mechanised props 19 may be controlled by one or more controllers mounted within the housing 1, optionally in a CAN bus arrangement with a hardware system, which may include the control module described below (which may be implemented in software or hardware).

In embodiments in which the wheel 2 does not extend below a lower face of the housing 1, no supporting props or legs may be provided and the housing 1 may instead be placed directly on the ground, a platform, or the likes. However, the skilled person would appreciate that supporting props 19 may still be beneficial, for example to provide a level base for the apparatus 100/to make the lower surface of the housing 1 level when the ground or other support is not level, and/or to provide a wider base for increased stability.

The capture wheel 2 as described herein may be provided as a stand-alone product, or integrated into an energy-generation apparatus 100, 200. In the energy-generation apparatus 100 of the embodiment being described, the wheel shaft 3 extends through the front face of the housing 1, from the external wheel 2 to the internal energy generation apparatus 110. The wheel shaft 3 is the input drive shaft 3 for the energy generation apparatus 110. A support bearing housing 4 is provided inside the housing 1 and adjacent the front face of the housing to support the wheel shaft 3. The support bearing housing 4 houses bearings for the wheel shaft 3 and comprises a tube or pipe through which a portion of the wheel shaft 3 extends. The support bearing housing 4 may help to prevent tilting of the wheel shaft 3 relative to the housing 1.

In the embodiment being described, a disconnect system 5 is provided, arranged to separate the wheel shaft 3 from the energy generation apparatus 110. The disconnect system 5 may be arranged to be used in an emergency (e.g. to prevent further power input in case of a generator fault), or in detachment and replacement of the wheel 2. In the embodiment being described, an inline clutch assembly 5 is used. The location of the disconnect system 5 is selected so that it may function as a fuse relief and disconnect the drivetrain when applicable. The disconnect system 5 may provide a short reaction time and effective isolation performance when carrying out a complete emergency stoppage of the capture wheel 2. An isolation button may be provided to activate the disconnect system 5. A remote, wired or wireless, emergency stop button may be provided, and/or a physical button may be provided on or within the housing 1. The emergency stop button may be accessible by opening a door of the housing 1 (e.g. the rear panel/face).

In the embodiment being described, a gear train 120 extends between the wheel shaft 3 and the generator 10. A first stage, or primary, gearbox 6 is provided. In the embodiment being described, the gears are housed within a casing, forming a gearbox 6. In alternative embodiments, the gears may not have a casing and the arrangement may be referred to as a gear point or geared connection instead of as a gearbox 6; however, the skilled person would appreciate that the term "gearbox" may still be used for such an arrangement. The primary gearbox 6 of this embodiment is a speed-increasing (or "step-up") gearbox; i.e. the output shaft 7 from the gearbox 6 is arranged to rotate faster than the input shaft 3. Rotation rate ratios may be set based on the intended feedstock and generator type.

In the embodiment being described, an epicyclic gear arrangement is used; the skilled person would appreciate that such an arrangement may provide a lower size and weight for the same torque output, and may provide an improved gear life as the load is split between multiple planets.

In the embodiment being described, a second stage, or secondary, gearbox 8 is also provided. A prop shaft 7 extends from the primary gearbox 6 to the secondary gearbox 8; the prop shaft 7 is the output shaft from the primary gearbox and the input shaft to the secondary gearbox 8. A (primary) flywheel 7a is provided on the prop shaft 7, which may therefore also be referred to as a flywheel shaft 7. In the embodiment being described, the flywheel 7a is located between the primary gearbox 6 and the secondary gearbox 8, and adjacent the secondary gearbox 8. The flywheel 7a is arranged to store kinetic energy and to keep rotating (at a higher speed) if the input shaft 3 stops (or slows). In the embodiment being described, the flywheel 7a is arranged to be used to provide scalable inertia by means of weight attachment—weights can be attached around the circumference of the flywheel 7a to increase its mass, allowing for a variation in engineering performance.

In the embodiment being described, the secondary gearbox 8 incorporates second and third stages of rotation speed increases. The skilled person will appreciate that gearing can be selected to accommodate a variety of speed ratios, and may vary in relation to what has been designed into the first stage transmission 6. In the embodiment being described, an epicyclic/planetary gear formation is again used.

This secondary gearbox 8 houses the secondary stage planet arrangement and a final, third, stage. In the embodiment being described, the third stage is an increasing stage of the gearbox 8, and has a parallel shaft design—it may therefore be referred to as a parallel take off configuration. In the embodiment being described, the third stage is designed to use 2 or 3 different gear ratios to facilitate efficient operation of the drivetrain, maintaining generator speed requirements and operating within the preferred tolerances and speed range.

The third stage comprises one or more clutches in the embodiment being described. If a gearset clutch is not operated, the gears of the third stage may "freewheel" with a set of bearings to ensure no torque is transmitted through the gearbox 8 (a failsafe position to disconnect the generator 10 from the drivetrain in case of problems). The clutches of the embodiment being described are controlled using an autonomous sensory control system. In the embodiment being described, the clutches are also arranged to be used to create a seamless speed increasing option to enable the drivetrain to ramp up from a low rotation speed to normal operating conditions without stalling. The skilled person would appreciate that other arrangements may be used for the third stage in other embodiments.

The parallel take off configuration (the third stage) may be referred to as "final" as the output shaft 9 from the secondary gearbox 8 extends to the generator 10 (described below), so any adjustments performed by the parallel take off configuration are the final adjustments prior to electricity generation.

The parallel take off configuration is arranged to be adjustable such that a suitable torque and input rotation speed:ouput rotation speed ratio can be selected based on the output from the secondary stage planet arrangement, so as to provide a suitable rotation rate for energy generation. The ratio may be selected to be a step-up or step-down in rotation speed, so as to keep the final rotation speed within a range best suited to the generator 10. Generally, a step-up ratio is selected. If the input rotation speed from the secondary stage planet arrangement drops below a satisfactory rate for power generation, the third stage gearing in parallel takeoff boosts the rotation speed.

In the embodiment being described, ratio changes are actioned by electronic instruction and gear transfer. An electronic control system (not shown) is provided to automate gear changes in response to rotation speeds passing set boundaries.

In the embodiment being described, an objective of the third stage is to maintain a minimum rotation speed of 1200 rpm into the generator 10. The skilled person would appreciate that the set minimum speed may vary between embodiments, for example depending on generator type. In the embodiment being described, the third stage take off is automated to action this process. The maintenance of the rotation speed above a set minimum may prevent the generator 10 from shutting down temporarily. The skilled person would appreciate that generators 10 generally have components arranged to regulate input energy, and that higher rotation speed-lower torque conditions may be favoured. As an example if the rotation speed is 1200 rpm the corresponding torque may be 400 Nm (Newton·metres), whereas if the rotation speed is increased to 2400 rpm, the corresponding torque may become 200 Nm. In the embodiment being described, an oil pump 11 is provided to keep the drivetrain components lubricated (in particular the support bearings 4, the first gearbox 6, and the second gearbox 8). In alternative embodiments, each gearbox may have its own oil pump. In the embodiment being described, an oil tank 12 is provided to store oil to be pumped by the oil pump 11.

A secondary flywheel 9a is provided on the prop shaft 9, between the secondary gearbox 8 and the generator 10. The prop shaft 9 is a cardan shaft in the embodiment being described. The secondary flywheel 9a is arranged to store kinetic energy from the final stage energy exiting the parallel takeoff and prior to its transferral to the generator 10 for electrical power generation. The secondary flywheel 9a is designed differently from the primary flywheel 7a in the embodiment being described, having a greater mass but a smaller diameter. The secondary flywheel 9a may therefore be better suited to the higher rpm rotation of its respective shaft 9 as compared to the primary flywheel 7a.

As for the primary flywheel 7a, the secondary flywheel 9a is arranged to allow circumferential weight attachment so that its inertia can be scaled as desired. In operation, should the main throughput energy fluctuate through the drivetrain 110, e.g. due to a reduction or pause in the flow of falling feedstock, the first and second stage flywheels 7a, 9a are arranged to provide an overrun in rotational inertia assisting in keeping the drivetrain rotating and maintaining power generation.

The housing of the secondary gearbox 8 of the embodiment being described incorporates two separate stages and is of a greater mass and size than the primary gearbox 6.

In the embodiment being described, the apparatus 100 is arranged to house and isolate the first stage gearbox 6 independently of the second stage gearbox 8. This separation may provide flexibility in mechanical alterations, inspection, and maintenance, alongside potentially facilitating manual handling procedures in industry.

The option of stand-alone items for the first and second stage epicyclic assemblies 6, 8 may facilitate the use of visual inspection techniques, continuity of plant operations, and/or ease of component replacement.

The prop shaft 9 is the input shaft for the generator 10. In the embodiment being described, the generator 10 is a permanent magnet generator (PMG). The skilled person will appreciate that PMG designs may be tailored according to unit scale, expected input rotational speed and torque ranges, and the likes. In the embodiment being described, the generator 10 is arranged to provide a minimum of 50 kW of electrical power continuously (for as long as the flow of falling material persists), and optionally 100 kW or more. 10,000 N·m of torque is provided to the generator 10 in this embodiment. Power output may vary based on the rate of flow of falling material and material weight as well as wheel design and the likes. In other embodiments, the apparatus 100 may provide a power of greater than or equal to 3 kW or 5 kW, and optionally greater than or equal to 10 kW or 50 kW. Batteries and/or capacitors (optionally housed between floor rails 16 of the housing 1) may be provided for energy storage in embodiments in which the output power is not immediately used or exported to a grid.

In the embodiment being described, an AC inverter is provided. The AC inverter is arranged to receive the (direct current, DC) generated electricity from the PMG and to output alternating current (AC) electricity suitable for a local grid, or other mains supply purposes. In alternative embodiments, no inverter may be provided The primary and secondary gearboxes 6, 8 and the two associated flywheels 7a, 9a may together be referred to as a gear train 120 of the apparatus 100. In alternative or additional embodiments, the gear train 120 may comprise zero, one, or three or more flywheels. In alternative or additional embodiments, the gear train 120 may comprise only one gearbox (optionally a multi-stage gearbox) or more than two gearboxes.

In the embodiment being described, the capture wheel 2 is arranged to have a rotation speed of around 10 rpm. The first stage (the first gearbox 6) comprises a planetary arrangement arranged to steps up the rotation speed by a factor of 6. The shaft entering the second gearbox 8 therefore has a rotation speed of around 60 rpm. The second stage planetary arrangement within the second gearbox 8 steps up the rotation speed by a further factor of 6, bringing the rotation speed to 360 rpm. The parallel take off third stage within the second gearbox 8 has three different gear ratios, with the lowest being arranged to step up the rotation speed by a factor of 3.3, bringing the 3rd stage output rotation speed to 1200 rpm for generation. The second two, higher, gear ratios of the third stage may be used when the input rotation speed to the third stage falls below the intended level, to maintain an output speed of around 1200 rpm.

In the embodiment being described, a detachable coupling 15, and more particularly a magnetic breakaway coupling 15, is provided on the prop shaft 9, between the flywheel 9a and the generator 10. The coupling 15 provides an "inline" safety feature; if the electrical generation equipment presents substantial opposing resistance or catastrophic failure then the prop shaft 9 can be disengaged from its connection, allowing the rest of the drivetrain to rotate freely and reducing the risk of damage to, or destruction of, the generator 10.

In the embodiment being described, the third stage parallel take off assembly 8 also comprises a clutch operating system which may be used to similar effect. Thus in practice the third stage would introduce those safety provisions ahead of the coupling breakaway device 15. The magnetic coupling 15 is included as a systems failsafe in the embodiment being described. In alternative embodiments, the third stage, within the secondary gearbox 8, may not comprise a clutch.

In the embodiment being described, a prop shaft retaining plate 14 is provided between the magnetic breakaway coupling 15 and the secondary gearbox 8. The prop shaft retaining plate 14 is arranged to assist in retaining the prop shaft 9 in position, for example should the magnetic breakaway coupling 15 be activated to detach it from the generator 10, so reducing the chance of damage to the drivetrain.

The skilled person would appreciate that a capture wheel 2 as described herein may be used with any suitable drivetrain, and that the specific embodiment is described by way of example only. It will be appreciated that details of the transmission 6 described above are provided by way of non-limiting example only, and that different power train configurations and components may be used in other embodiments. For example, individual gear stages may be housed in one integrated casing, the transmission length may be reduced (or increased), flywheels may be not used, or may be replaced by other components, and the like.

In the embodiment being described, the energy generation apparatus 110 is mounted on a platform 13. The entire drivetrain is contained within the housing 1, oriented along the length of the housing 1 in the embodiment being described. The platform 13 spaces the energy generation apparatus 110 from the floor of the housing 1. The skilled person would appreciate that the spacing may reduce the chance of damage due to impact in transport, may reduce the chance of drivetrain damage following water ingress, and/or may facilitate heat loss from drivetrain components. Further, the platform 13 may facilitate alignment of the gear train 120 with the hub of the wheel 2, providing a base on which the gear train components may be securely mounted.

The platform 13 is mounted on a pair of floor rails 16 extending along the length of the housing 1. In the embodiment being described the platform 13 is rectangular, and extends lengthways along a central portion of the housing 1. In the embodiment being described the platform 13 occupies around two thirds of the width of the housing 1 and around five sixths of the length of the housing 1. Relative and absolute lengths and widths may vary in other embodiments.

In the embodiment being described, a safety cage 17, 18 is provided around the drivetrain components, as shown in FIG. 6. In the embodiment being described, the safety cage surrounds the entire drivetrain (excluding the capture wheel 2), and the platform 13. In the embodiment being described, the safety cage 17, 18 is made of a metal mesh, and may act as a Faraday cage.

In the embodiment being described, the safety cage 17, 18 is a retractable safety cage. A first portion 17 of the cage extends rearwards from the front face of the housing 1 (adjacent the wheel 2), along the length of the housing 1 to the position of the secondary gearbox 8. A second portion 18 of the cage extends forwards from the rear of the generator 10, and into the first portion 17 such that the two cage portions 17, 18 overlap. The second portion 18 is arranged to be slidable within the first portion 17, such that the cage 17, 18 can retract, permitting access to the oil pump 11, generator 10 and magnetic breakaway coupling 15—the skilled person would appreciate that the generator 10 and pump 11 may be the parts most likely to need regular servicing. The whole of the cage 17, 18 may be removable to provide improved access to the gearboxes 6, 8 and disconnect system 5.

In the embodiment being described, the safety cage 17, 18 (which may also be referred to as a protective cage) does not extend all the way to the rear face of the housing 1, providing access space for a user to step into the housing 1 before moving the safety cage 17, 18, and/or to move from one side of the cage 17, 18 to the other. The cage 17, 18 may extend only as far as the platform 13. In alternative or additional embodiments, the safety cage 17, 18 and/or the platform 13 may extend the full length of the housing 1.

Figure 5A:
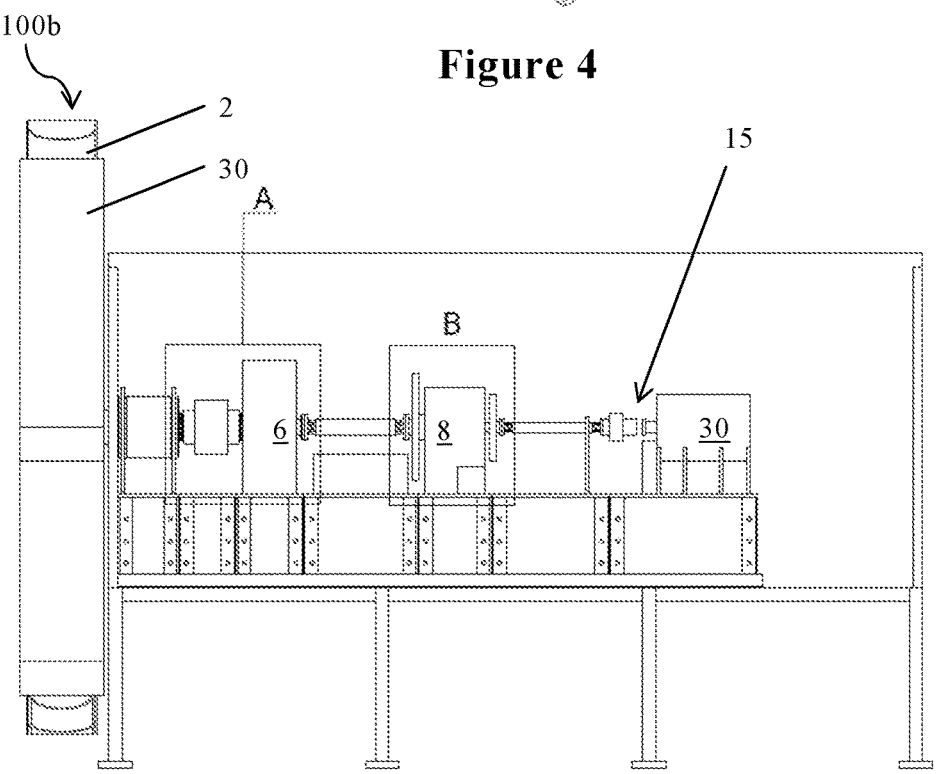
FIG. 5A is a cut-away side view of a similar apparatus of a different embodiment.

A similar apparatus 100b of an alternative embodiment is shown in FIGS. 5A to 5C. The apparatus 100 is generally as shown in FIGS. 1-4 and 6, but with a hopper 30 present and different bucket shapes. The generator 10 is also a different size and shape. The skilled person would appreciate that such parameters may be adjusted within a wide range of possibilities without departing from the scope of the invention. The breakaway coupling 15 is shown in its decoupled position in FIG. 5A. Two portions of the gear train are marked in FIG. 5A: A. the disconnect system 5 (drive coupling and clutch) and primary gearbox 6; and B. the secondary gearbox 8 and primary and secondary flywheels 7a, 9a. These gear train portions are shown in close-up in FIGS. 5B and 5C, respectively.

In the various embodiments being described, various supporting systems are provided within the housing 1. The supporting systems may be independent. Each system may contribute to overall performance and functionality of the apparatus, and/or facilitate inspection and maintenance.

Environmental Control—Heating, Ventilation, and Air Conditioning (HVAC)

In the embodiment being described, a housing 1 is provided and a system is incorporated to regulate and control the air temperature and/or humidity inside the housing 1. The skilled person would appreciate that external temperatures may vary considerably in some environments, and that maintaining a more constant temperature may be beneficial to drivetrain lifespan.

Temperature and/or humidity sensors may be provided within the housing, and an electronic control system may alter air flow within the housing 1 (for example by means of one or more controllable fans and/or openable vents) to regulate temperature and/or humidity. The outer surface of the housing 1 may be painted a suitable colour to either reflect or absorb sunlight, depending on expected weather conditions and the desired temperature.

In recognition of environmental health and the risk of working in enclosed spaces, the HVAC filtration system may be programmable to maintain suitable conditions for workers, which is likely to be a narrower range than required based on optimising drivetrain performance alone. The skilled person would appreciate that air quality may be paramount to personnel working in a semi-confined area, such as inside the housing 1. In the embodiment being described, ventilation slots 20 are provided in the rear face of the housing 1, to allow for some air-flow even when the door (not shown) is fully closed. In the embodiment being described, the HVAC settings can be accessed via an external panel compartment—personnel may therefore view and assess HVAC recordings prior to entering the housing 1.

Fire Prevention—Safety System

In the embodiment being described, an alert system is provided to give an alarm (e.g. audible and/or visual) to personnel if smoke, fire, and/or excessive heat is detected. In the embodiment being described, the alert system is a stand-alone system (e.g. battery-powered), comprising one or more sensors, one or more lights, and one or more buzzers or sirens.

Information Sensors

In the embodiment being described, drivetrain components incorporate a network of sensors, arranged to sense and report data on shaft rotation speed, torque, temperature, stress and/or load to a control module. In the embodiment being described, the control module is located within the housing 1 and may therefore be referred to as an internal control module. In alternative or additional embodiments, the data may be transmitted (wirelessly or via a wired connection) to an external control module. Performance of the apparatus 100 can be checked and monitored using the received data. In some embodiments, such as those described below with respect to FIGS. 21 to 28, the data may include strain data provided by strain gauges 212a associated with dampers 212, and the stiffness of one or more dampers may be adjusted based on the strain data, so as to adjust for changing impacts on the wheel 2. The control module may therefore perform automatic adjustment of wheel properties.

Operations Control Panel

In the embodiment being described, data display panels are provided externally from the housing 1. The displays may provide oversight on apparatus performance.

In alternative embodiments, more, fewer or different supporting systems may be provided—the skilled person will appreciate that the systems listed for the embodiment being described are listed by way of example only.

Figure 7:
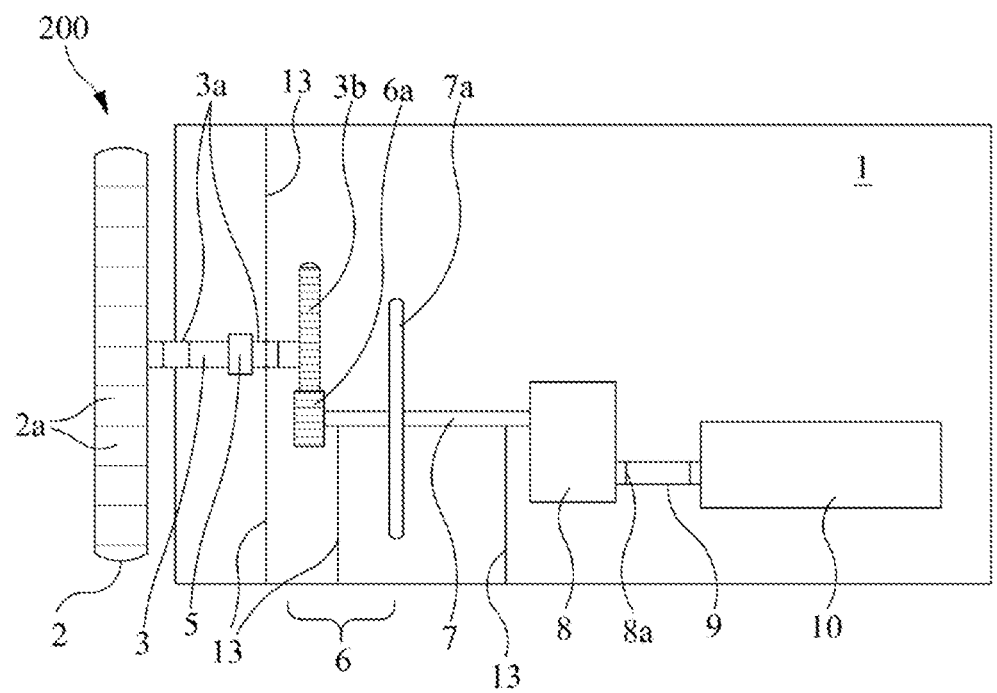
FIG. 7 is a cross-sectional side view of an apparatus of another embodiment.

FIG. 7 illustrates a power generation apparatus 200 of a different embodiment.

The power generation apparatus 200 of the embodiment shown in FIG. 7 comprises a mechanical assembly which may be accommodated into a production line with ease (for example, the height of the apparatus 200 may be selected to be less than the height above the ground of a conveyer system of the site, to allow the apparatus 200 to be positioned below the conveyer, and/or the wheel design may be selected to work with a standard hopper). The skilled person would appreciate that some allowances may be made for the gravity sand fall; for example in terms of apparatus positioning.

In the embodiment being described, once the apparatus 200 is positioned, the sand material passes downward through a hopper (not shown) and into a bucket 2a on a bucket wheel 2 (an example of a capture wheel 2). The bucket wheel 2 may also be described as a sand wheel. The mass of sand material then falls and increases the newton force and rotation factor of the bucket wheel 2. The bucket wheel 2 is mounted on a bucket wheel shaft 3, which may also be referred to as an input drive shaft 3. The bucket wheel shaft 3 is supported on bearings 3a in the embodiment being described. The bucket wheel shaft 3 comprises a toothed gear ring 3b. In the embodiment being described, the toothed gear ring 3b comprises a solid steel disk with a toothed outer diameter. In turn, the bucket wheel shaft 3 transfers the forces to an attached inner gear ring 6a. The teeth of the toothed gear ring 3b mesh with teeth of the inner gear ring 6a.

The torque is then transferred onto a flywheel shaft 7, which may also be referred to as a propshaft. The flywheel shaft 7 and the bucket wheel shaft 3 are both made of steel in the embodiment being described; the skilled person would appreciate that other materials may be used in other embodiments.

In the embodiment being described, the torque is transferred via a connecting gear point 6, which may be housed and may be referred to as a first stage gearbox 6. In the embodiment shown in FIG. 7, the connecting gear point 6 does not have a separate housing.

This connecting gear point 6 incorporates a free spool, which is arranged to allow a continual drive and/or acceleration to the flywheel shaft 7. Importantly, in the embodiment being described the acceleration of the flywheel shaft 7 is not directly relative to the bucket inner gear ring 6a, which is allowed to freewheel as the counterpart flywheel 7a maintains its speed for longer due to its inertia when the input energy reduces or is cut off.

The skilled person would appreciate that the clutches of the apparatus 100 described with respect to FIGS. 1 to 6 replace, and perform the function of, the free spool of the embodiment being described. The skilled person would appreciate that either or both clutches and free spools may be used in alternative embodiments of either apparatus design.

In the embodiment being described, the bucket wheel shaft 3 comprises a mechanical shaft break 5, which may also be referred to as a drive coupling. The shaft break 5 may be used for emergency stoppage purposes, e.g. if a fault occurs with the generator 10.

The flywheel shaft 7 carries the torque energy into a housed gearbox 8, which may also be referred to as a second stage gearbox 8. In the second stage gearbox 8, a step-up occurs in the overall rotation speed between the input shaft 7 and the output shaft 9, which may also be referred to as a propshaft 9. In the embodiment being described, rotation speed increase ratios can take any value from 1/1 up to 100/1, and preferably greater than or equal to 50/1, for example 80/1 or 60/1. In the embodiment being described, the gear train is arranged to generate an output rpm of 1200 for power generation. The rpm of the capture wheel 2 is around 15-20 rpm—a substantial step up ratio is therefore provided.

In the embodiment being described, a single output flange 8a extends from the gearbox 8. The output flange 8a is connected directly in line with a chosen generator system 10, by means of a generator shaft 9, which may be referred to as a prop-shaft. In the embodiment being described, the gearbox 8 is arranged such that the prop-shaft 9 rotates at a higher speed than the flywheel shaft 7—the prop-shaft 9 may therefore be referred to as a step-up prop-shaft, or the gearbox 8 as a step-up gearbox.

In the embodiment being described, prop-shaft speeds are maintained in the region of 1500 rpm and above. The skilled person would appreciate that desired speed ranges may differ depending on the type of generator 10.

The prop-shaft 9 is connected to, and acts as an input shaft for, the generator 10. The generator 10 generates electricity from the rotation of the flywheel shaft 7. In the embodiment being described, the generator 10 is a permanent magnet generator. For example, the generator 10 may comprise a wire coil and the flywheel shaft 7 may comprise one or more magnets arranged to lie within the wire coil. Rotation of the magnet(s) within the coil may generate electricity.

In the embodiment being described, two different gearboxes 6, 8 or gear connections are provided. In alternative embodiments, no gearbox 6, 8 may be provided. In such embodiments, a single shaft may extend between the bucket wheel 2 and the generator 10. In further alternative embodiments, a single gearbox 6, 8 may be provided. The single gearbox may step up the rotation speed between the bucket wheel shaft 3 and the generator shaft 9.

The skilled person would appreciate that the presence of two gearboxes or gear connections 6, 8 in various embodiments, with a flywheel 7a between them, may improve performance by facilitating the storage of rotational energy. The flywheel 7a may resist changes in rotational speed due to its relatively large moment of inertia (resulting from the relatively large rotating mass of the flywheel disk).

In the embodiment being described, the mechanical assembly, except the bucket wheel 2, is housed in a housing 1. The bucket wheel 2 is located outside of the housing 1 and mechanically connected to the remainder of the mechanical assembly.

In the embodiment being described, the housing 1 is a steel shipping-type container 1. In alternative embodiments, the housing 1 may be replaced with a wall, building, support pylon or the likes, which may or may not be transportable. The housing 1 is arranged to accommodate and protect the mechanical assembly. In the embodiment being described, the housing 1 measures approximately 6.1×2.4×2.4 m (20× 8×8 ft). In alternative embodiments, different housing sizes may be used. The skilled person would appreciate that housing the apparatus 200 in a housing 1 the size of a standard shipping container may facilitate transportation of the apparatus 200.

In the embodiment being described, extendable lower leg or prop supports may be added for stability once the apparatus 200 is deployed in situ.

The external component of the mechanical assembly is the bucket wheel 2, which may also be referred to as a capture wheel as it captures the falling material. The skilled person would appreciate that bucket capture wheels 2 of various designs, sizes and dimensions may be used with otherwise the same mechanical assembly.

In the embodiment being described, the bucket wheel 2 has a diameter (A) in the range of approximately 2 m to 4 m, for example 2.4 m to 3.7 m (8-12 feet). The skilled person would appreciate that wheel diameter, A, may vary between embodiments, depending on the required application.

In the embodiment being described, the bucket wheel 2 has a width (perpendicular to the diameter) in the range of approximately 20 cm to 50 cm, for example 25.4 cm to 45.7 cm (10-18 inches). The skilled person would appreciate that wheel width may vary between embodiments, depending on the required application.

In the embodiment being described, the bucket wheel 2 takes a form similar to a Pelton wheel. In alternative embodiments, any suitable bucket wheel design may be used, for example depending on the type of material to be captured.

In the embodiment being described, internal supports 13 are used to support the mechanical assembly components within the housing 1. In the embodiment being described, the internal supports 13 are made of steel; different or additional materials may be used in other embodiments.

Figure 8:
FIG. 8 is a side view of the apparatus of the embodiment of FIG. 7.
Figure 9:
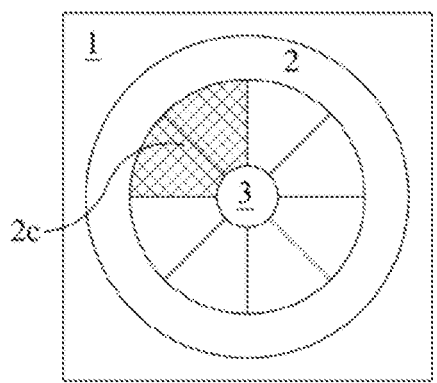
FIG. 9 is a front view of the apparatus of the embodiment of FIG. 7.

External side and front views of the apparatus 200 of FIG. 7 are shown in FIGS. 8 and 9, respectively.

In the embodiment being described, the housing 1 is substantially square in cross-section, and the wheel 2 is centrally mounted on the housing 1. In the embodiment being described, the wheel diameter is selected to be shorter than a side length of the square face of the housing 1, such that the wheel 2 does not extend beyond the housing 1 (see e.g. FIGS. 8 and 9). The skilled person would appreciate that sizing and positing the wheel 2 in this way may avoid a need for any legs or supports to raise the housing 1, and may additionally facilitate transportation and/or stacking of multiple such apparatuses 200. In alternative embodiments, the wheel 2 may be larger—in such embodiments, legs or the likes may be provided to raise the housing 1 in use, the housing 1 may be placed on a raised area compared to ground level beneath the wheel 2, and/or the wheel 2 may be mounted above the centre of the housing 1 (so extending above the housing 1, but not below it).

Figure 10:
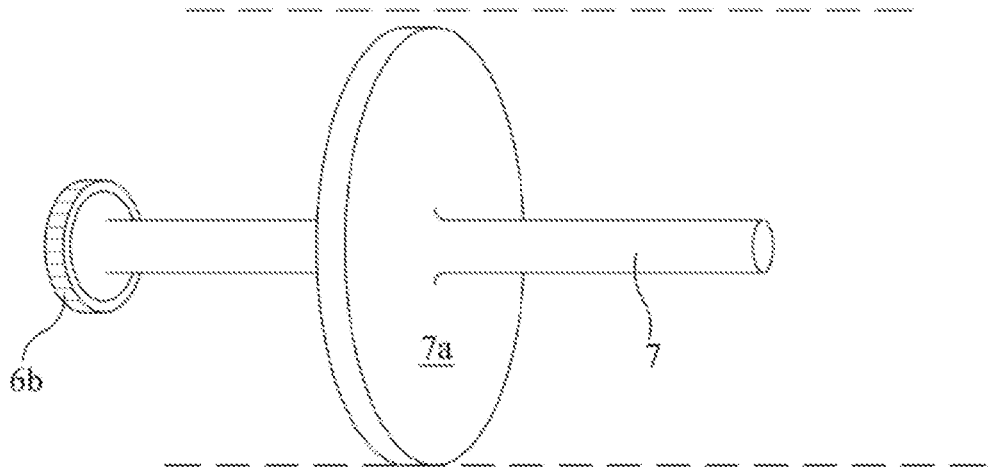
FIG. 10 is a close-up view of the flywheel arrangement of the apparatus of the embodiment of FIG. 7.

FIG. 10 illustrates the flywheel arrangement 6a-7a of the embodiment being described. In the embodiment being described, the flywheel 7a is a solid steel flywheel; the skilled person would appreciate that other materials may be used in other embodiments, but that relatively dense materials are generally selected for flywheels as the higher mass is useful for storing kinetic energy. In the embodiment being described, the flywheel 7a has a diameter of a minimum of 60 cm (24") and a thickness of a minimum of 1 cm (0.5"). In the embodiment being described, the freewheel/free spool assembly 6b is located within the inner gear ring 6a. The freewheel 6b allows the flywheel shaft 7 to keep rotating (aided by the inertia of the flywheel 7a) if the rotation of the wheel 2 slows or stops (e.g. due to a reduced or interrupted flow of the mineral material). In the embodiments described with respect to FIGS. 1 to 6, a clutch is used in place of a free spool. The skilled person would appreciate that a free spool could alternatively be used with the apparatuses 100, 100b described with respect to those figures, for example with the free spool being incorporated into the output shaft 7 from the first gearbox 6. In both embodiments, a shaft disconnect arrangement—be that a free spool or a clutch—is used to allow the flywheel shaft to rotate more quickly than its input shaft when suitable.

Figure 11:
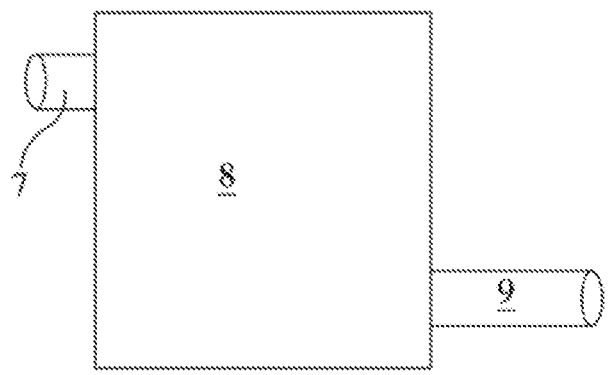
FIG. 11 is a close-up view of the gearbox of the apparatus of the embodiment of FIG. 7.

FIG. 11 illustrates the gearbox 8 of the embodiment being described. In the apparatus 200 of this embodiment, the shafts 7, 9 are offset on either side of the secondary gearbox 8. By contrast, in the embodiments 100, 100b described above, the shafts 7, 9 are in line. The shafts 7, 9 were moved to be inline as this was deemed more suited to the higher torques (e.g. 60,000 Newton·metres) generated by the capture wheel 2 of those embodiments as compared to the (smaller) capture wheel of the present embodiment.

Figure 12:
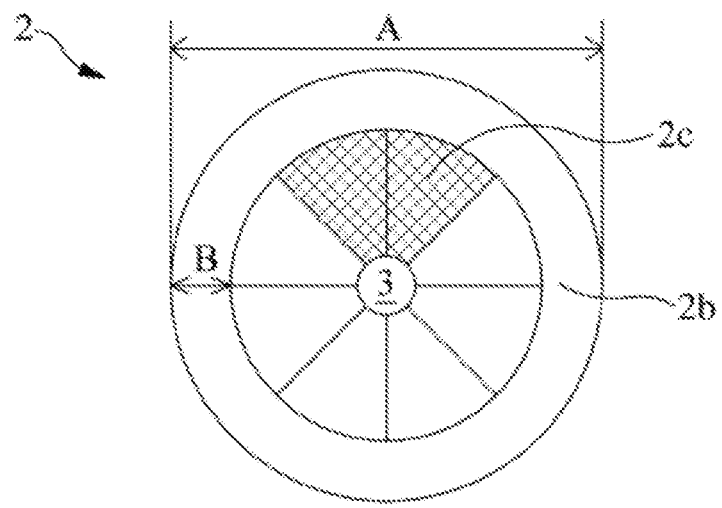
FIG. 12 is a close-up view of the wheel of the apparatus of the embodiment of FIG. 7.

FIG. 12 shows a close-up view of the bucket wheel 2, mounted on the bucket wheel shaft 3. In the embodiment being described, the wheel 2 comprises an outer ring 2b. In the embodiment being described, the outer ring 2b is made of stainless steel; the skilled person would appreciate that other materials may be used in other embodiments. In the embodiment being described, the outer ring 2b has a width (along the diameter of the wheel 2) of 25-41 cm (10-16 inches).

In the embodiment being described, the wheel 2 comprises weld mesh inserts 2c (shown across one quadrant only in FIGS. 9 and 11 for clarity, but actually extending across the entire wheel surface in the embodiment being described). The mesh inserts 2c extend between struts/spokes of the wheel 2, and are fastened across both sides of the wheel 2 in the embodiment being described. The mesh inserts are arranged to prevent, or reduce the likelihood of, entanglement or entrapment by the wheel shafts, and may also reduce the chance of falling feedstock jamming the wheel 2, by keeping any large particles (larger than the mesh size) away from the wheel hub and bearings.

In use, sand material is allowed to fall under gravity from a hopper so as to cause the bucket wheel 2 to rotate. The generated rotational force is then translated through the mechanical assembly to the electric generator 10, which generates electricity.

Figure 13:
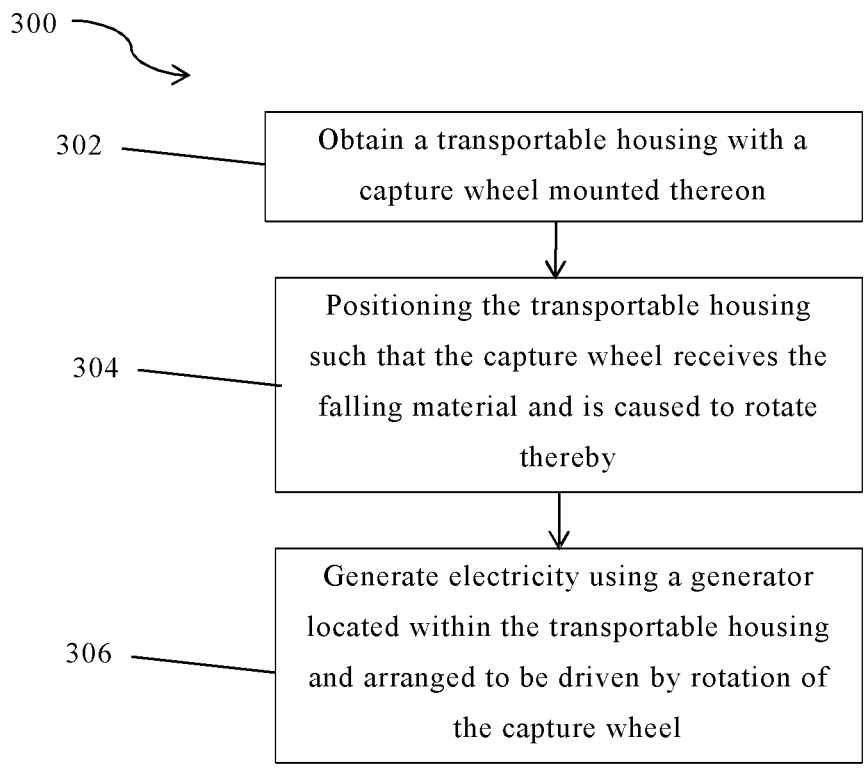
FIG. 13 is a flow-chart illustrating a method in which a capture wheel or energy-generation apparatus of an embodiment may be used.
Figures 14A, 14B:
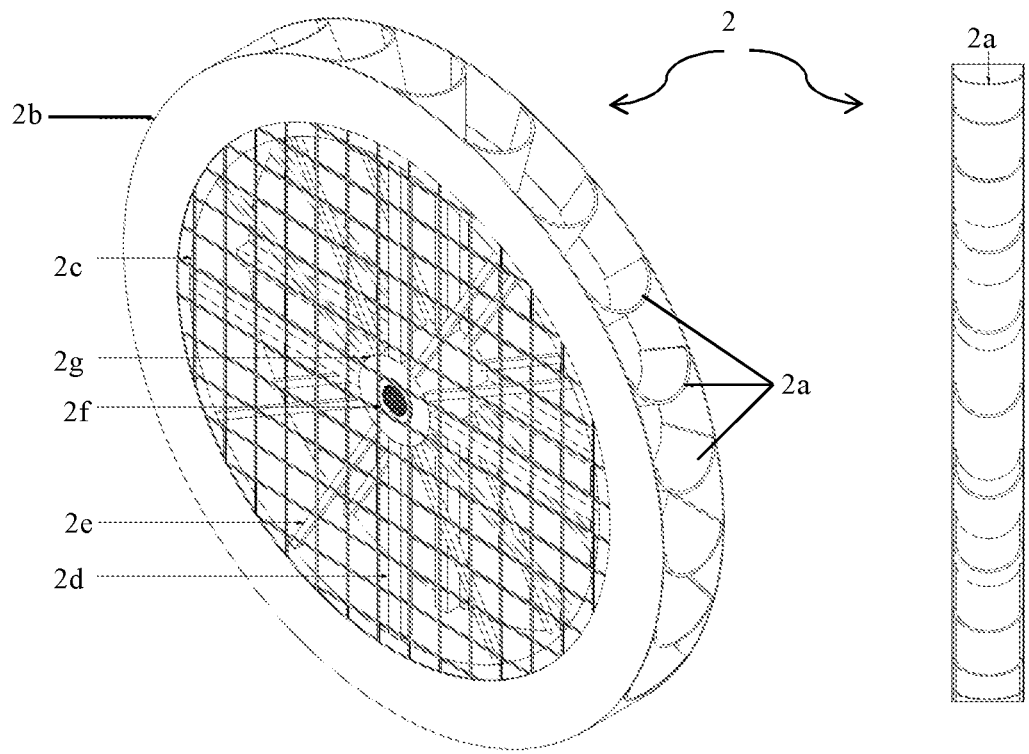
FIGS. 14A, 14B and 14C are perspective, side and front views of a wheel of an embodiment, respectively.
Figure 14C:
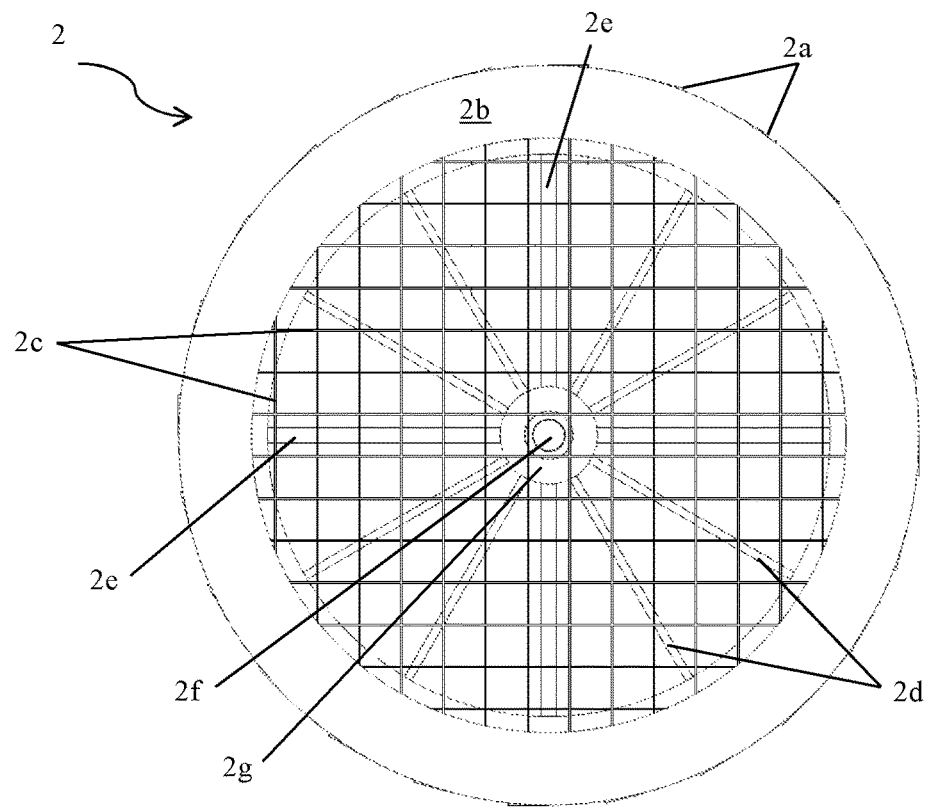

FIG. 13 illustrates an energy generation method 300 of an embodiment. The method 300 comprises obtaining 302 a transportable housing 1 with a capture wheel 2 arranged to be mounted thereon. The obtaining step 302 may comprise arranging delivery of a shipping container 1 to an intended site of use. The capture wheel 2 may be packaged within the shipping container 1 for transit.

The method 300 comprises positioning 304 the transportable housing 1 near a location of falling material, for example adjacent the end of a conveyer belt arrange to remove debris from a mine entrance. The housing 1 is positioned such that the capture wheel 2 receives the falling material and is caused to rotate by the falling material. The positioning 304 may comprise mounting the capture wheel 2 on the housing 1, before or after aligning the housing 1 with the intended location of the falling material. At least a portion of the capture wheel 2 is located beneath the falling material in use.

In alternative embodiments, the obtaining 302 a transportable housing 1 with a capture wheel 2 may be replaced by obtaining a capture wheel 2, and the positioning 304 the housing 1 may be replaced with mounting the obtained capture wheel 2 in a suitable location for receiving falling material (and/or by arranging conveyer belts or the likes to transport solid material to a suitable place to fall onto the wheel 2). Any suitable structure may be used in place of the housing 1. The skilled person would appreciate that the same wheel design may function to mitigate impacts irrespective of what it is mounted on.

The method 300 comprises generating 306 electricity using a generator 10 is arranged to be driven by rotation of the capture wheel 2, so generating electricity from the kinetic and/or gravitational energy of the falling material. The generator 10 may be located within a/the transportable housing 1.

FIGS. 17 to 20 illustrate a dual-mass boss 170 (also referred to as a hub 170) suitable for use in various embodiments, including with drivetrains and/or housings such as those described above. The boss 170 comprises the central core 2f and the layer 2g of resilient material, and in addition comprises an outer support ring 2h for the hub, surrounding the layer 2g of resilient material. The hub 170 may therefore be described as a tri-layer hub. The central core 2f and the outer support ring 2h are both effectively rigid (intended not to change shape in use). The outer support ring 2h therefore prevents the compression of the hub 170 as a whole, but the resilient layer 2g allows the outer support ring 2h to move relative to the central core 2f when struck, for example pushing the outer support ring 2h downwards with respect to the central core 2f, and therefore with respect to a drive shaft 3 on which the hub 170 is mounted, when struck by material falling from above. The impact transferred to the shaft 3 is therefore reduced, so reducing the risk of damage to drivetrain components. The resilient layer 2g is arranged to secure the outer support ring 2h and the central core 2f so as to minimise or prevent relative rotation of the outer support ring 2h and the central core 2f, whilst allowing some radial movement (by compression and recovery of the resilient layer 2g).

In this example, the resilient layer 2g is made of a PolyMide™ polymer—PolyMide™ indicating a family of nylon/polyamide-based polymers. Alternative or additional resilient polymers, or other resilient materials, may be used in other embodiments. For example, various composite materials, polyurethane, or the likes may be used.

The central core 2f of the boss 170 has a toothed or splined inner circumference and is arranged to mesh with a toothed or splined drive shaft 3, and to rotate the drive shaft 3, in use. An outer circumference of the central core 2f comprises at least one protrusion 172f, and optionally a plurality of protrusions 172f, extending therefrom. The resilient layer 2g comprises a corresponding set of recesses on its inner surface, each recess arrange to receive a protrusion 172f of the central core 2f. The interengagement of the recesses and protrusions may prevent relative rotation of the components.

Figure 20:
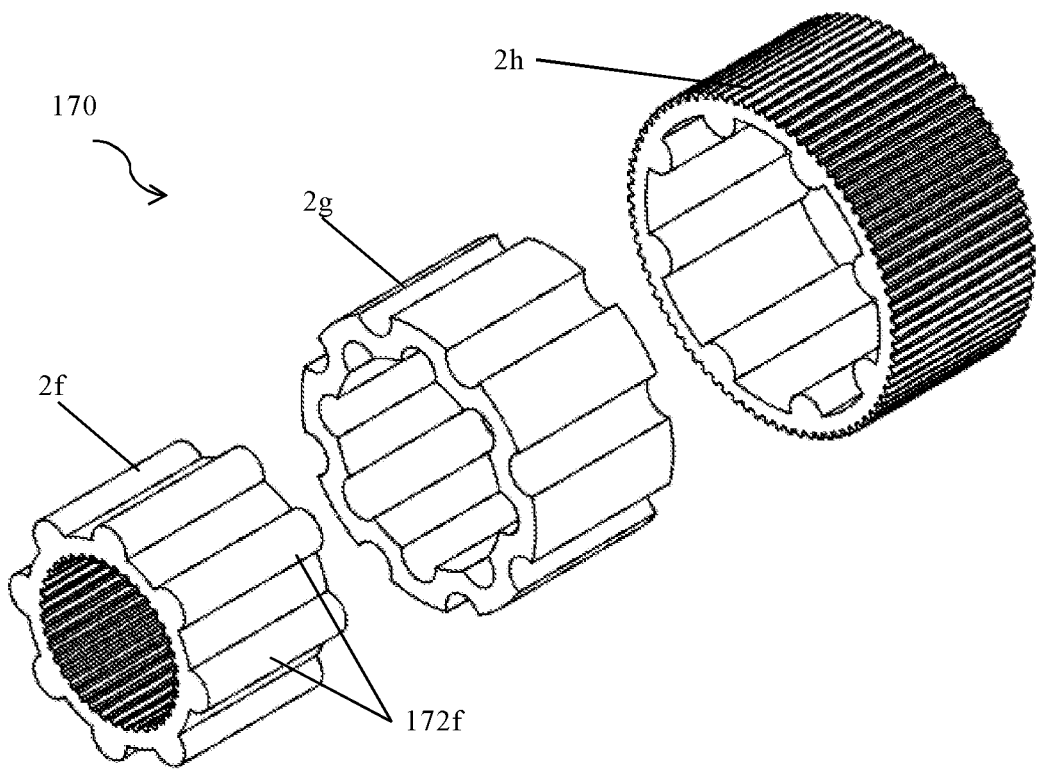
FIG. 20 is an exploded view of the hub shown in FIGS. 17 to 19.

In the embodiment shown in FIG. 20, the protrusions take the form of ribs with curved surfaces, the ribs extending parallel to the shaft 3/perpendicular to the front and rear faces of the boss 170. In alternative or additional embodiments, the protrusions 172f may take a different form, or may be replaced with recesses, indentations or the likes. The recesses take the form of channels oriented parallel to the shaft 3/perpendicular to the front and rear faces of the boss 170 in the embodiment shown in FIG. 20. The orientation of the ribs 172f and corresponding channels parallel to the shaft direction may facilitate boss/hub assembly—sliding the central core 2f and the resilient layer 2g together when manufacturing the boss 170. The resilient nature of the resilient layer 2g may facilitate the construction of the boss 170, for example with the resilient material being designed to be slightly compressed around the circumference/between the protrusions 172f, 172g, so improving grip on the central core 2f.

In alternative or additional embodiments, the central core 2f may comprise one or more recesses and the resilient layer 2g one or more protrusions, each may comprise a mixture of recesses and protrusions, and/or a variety of different sizes and shapes of recesses may be provided. In alternative embodiments, no complementary protrusions and recesses may be provided and the components of the boss 170 may instead be secured together in such a way as to not rotate independently by any different suitable means known in the art.

Similarly, in the embodiment shown in FIG. 20, the outer support ring 2h comprises inwardly-directed protrusions 172h extending from its inner surface, again taking the form of ribs. The resilient layer 2g comprises a corresponding set of recesses on its outer surface, each recess arrange to receive a protrusion 172h of the outer support ring 2h. The outer support ring 2h is therefore mounted on the resilient layer 2g. The recesses take the form of channels oriented parallel to the shaft 3/perpendicular to the front and rear faces of the boss 170 in the embodiment shown in FIG. 20. As briefly indicated above, the design shown is simply one example amongst many possible designs for interlocking surface shaping that could be envisaged by the skilled person.

In the embodiment shown in FIG. 20, the channels in the outer surface of the resilient layer 2g are circumferentially offset from the channels in the inner surface of the resilient layer 2g—the peaks of the protruding ribs 172f, 172h are likewise offset. A greater thickness of the resilient material may therefore be provided between the inner 2f and outer 2g rings of the boss 170 than if the protrusions 172f, 172g were aligned, for the same layer thickness of the resilient material.

The outer surface of the outer support ring 2h may be treated or prepared so as to facilitate connection of the wheel framework 2d, 2e thereto. The wheel framework 2d, 2e is mounted on the outer support ring 2h, and thereby mounted onto the resilient layer 2g. For example, the outer surface of the outer support ring 2h of the arrangement shown in FIGS. 17 to 20 is keyed, providing surface roughness or patterning 174, which may facilitate non-sliding mounting of struts and the likes.

The skilled person would appreciate that component dimensions may be scaled as appropriate. For example, for a capture wheel 2 with a diameter of 4.8-5.5 m (16-18 feet), the diameter of the drive shaft may be around 280-300 mm, and the diameter of the boss may be 600-800 mm.

For example, the central core 2f may have a wall thickness of 15-100 mm, the resilient layer 2g may have a wall thickness of 40-300 mm and the outer support ring 2h may have a wall thickness of 15-100 mm.

In the example shown in FIGS. 17 to 20, the boss 170 is designed for a capture wheel 2 with a diameter of 4.8-5.5 m (16-18 feet), and a drive shaft with a diameter of around 280-300 mm. The central core 2f and the outer ring 2h each have a wall thickness of 25 mm in the spaces between protrusions 172f, 172g and a thickness of 50 mm at the thickest point/the peak of each protrusion 172f, 172g. The resilient layer 2g has a thickness of 150 mm, ignoring the channels.

The diameter of the central core 2f is therefore 330-350 mm, discounting the projections, the diameter of the resilient layer is 630-650 mm, and the diameter of the outer ring 2h is 680-700 mm. In one example, the measurements of the complete hub assembly 170 for a 4.8 m (16') diameter wheel 2 are a width, W, (along the intended drive shaft location) of 60 cm (24"); an outer circumference of 66-71 cm (26-28"); and an inner circumference of 25-31 cm (10-12"). Measurements can be adjusted as appropriate for different wheel and/or shaft sizes, and different expected impacts (amongst other considerations).

In the arrangement being described, the inner core 2f and the outer support ring 2h of the hub 170 are both made of stainless steel. An austenitic stainless steel, such as stainless steel grades between 304 and 330 (inclusive) may be used. Such a steel may provide a high level of corrosion resistance as well as being non-magnetic or only very slightly magnetic. Steels used for the hub 170 may be selected to have a higher nickel content than steels used elsewhere in the wheel 2, as the higher nickel content generally makes the steel more expensive so may be used only when the properties are particularly needed. The higher nickel content may improve the thermal performance of the hub 170—for example reducing deformation when the hub 170 gets hot due to environmental conditions and/or energy absorbed by the resilient layer 2g (e.g. due to its lower coefficient of thermal expansion and improved thermal cycling properties). Inconel® alloys or the likes may be used, for example in extreme environments for which the levels of heat to be endured by the wheel 2 justify the additional expense. In some embodiments, a coating on one or more surfaces of the hub 170 may be provided instead of, or as well as, using an alloy for the hub specifically chosen for its thermal performance. A cheaper steel may therefore be used for the majority of the hub 170 whilst still retaining some or all of the thermal performance improvements due to the coating. The coating may be or comprise an alloy, for example containing one or more of nickel, copper and zinc (e.g. brass). Additionally or alternatively, the coating may comprise metal oxide powders such as $ZrO_2$, $Cr_2O_3$ and $TiO_2$. Further, different coatings may be applied to different areas of the hub surface to tailor thermal condition to suit the set-up.

In the arrangement being described, the resilient layer 2g is high-pressure fitted between the inner core 2f and the outer support ring 2h of the hub 170. The fitting may be performed in a controlled manufacturing environment to avoid contamination with foreign bodies which could reduce the frictional engagement between the resilient material and the metal components of the hub 170. The incorporation of a resilient layer 2g, which may for example be or comprise a manufactured polymer material, as part of the wheel hub 170 may effectively dissipate impact forces, so improving apparatus longevity. A resilient material may be designed or chosen to have suitable properties for the intended wheel geometry, dimensions, materials, and impact type.

Once the hub 170 is assembled, the hub 170 may be located on a drive shaft 3 and the rest of a capture wheel 2 may then be assembled on the hub 170. Assembling the wheel 2 on the drive shaft 3 may facilitate handling and mounting, especially for large capture wheel sizes. Alternatively, the wheel 2 may be fully assembled before mounting on a drive shaft 3.

In the embodiments being described, the struts 2d, 2e of the wheel framework are connected to the outer support ring 2h of the hub 170, at or near the inner ends of the struts, and thereby connected to the resilient layer 2g. In alternative embodiments, there may be no outer support ring 2h. In such embodiments, the struts 2d, 2e may be differently connected to the hub 170, and more specifically differently connected to the resilient layer 2g of the hub; for example being anchored into the resilient layer directly. In some such embodiments, the struts 2d, 2e may comprise an anchor point, for example taking the form of a loop or T-shaped inner end, and the resilient layer 2g may be moulded and set around the struts 2d, 2e, so anchoring the struts 2d, 2e within the resilient layer 2g. In arrangements in which anchor points of struts 2d, 2e are cast into the resilient layer 26, the material for the resilient layer may be selected to have a higher Bashore rebound test value than for arrangements in which the struts 2d, 2e are connected to an (effectively) rigid support ring 2h. For example, a material with a Bashore rebound test value of greater than 40%, and optionally 41-42% may be selected for arrangements with a support ring 2h, whereas a material with a Bashore rebound test value of greater than 60%, and optionally 75-90% or 80-100%, may be selected for anchored struts. The Bashore rebound test may be thought of as a measure of the resilience of the material 2g. The Bashore Rebound test measures resilience on a scale of 0 to 100; a 100% material with a Bashore Rebound test value of 100% would return all of the input energy upon recovery. The skilled person would appreciate that energy not returned would instead generally be absorbed as heat, and that it may be desirable not to heat the hub 170, or more specifically the resilient layer 2g, excessively so as to minimise or avoid distortion. Minimising distortion may be of particular importance when the resilient layer 2g serves to anchor the struts 2d, 2e, as distortion of the resilient layer could allow a strut 2d, 2e to break free. A higher Bashore Rebound test value may therefore be desirable to reduce heating of the hub 170; however, a value of less than 100% may be preferred in various embodiments to reduce rebound impacts on wheel components. For example, a maximum value of 80%, 85%, 90% or 95% may be selected.

Figure 22:
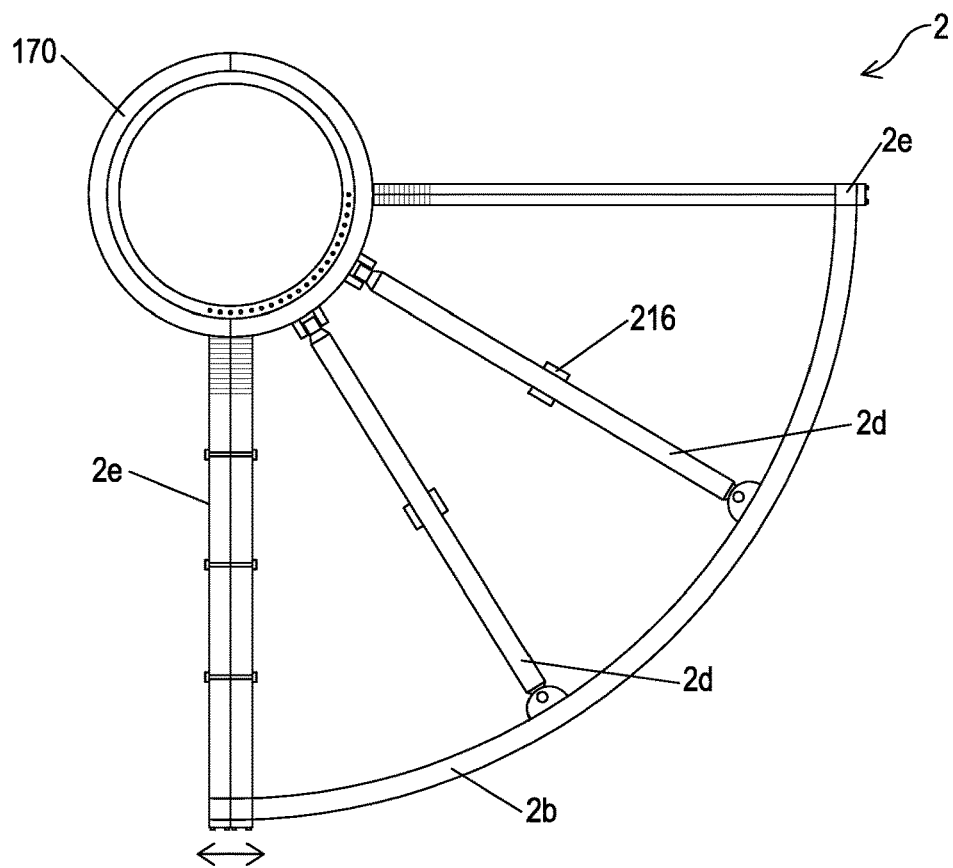
FIGS. 22 and 23 illustrate strut placement around a capture wheel
Figure 23:
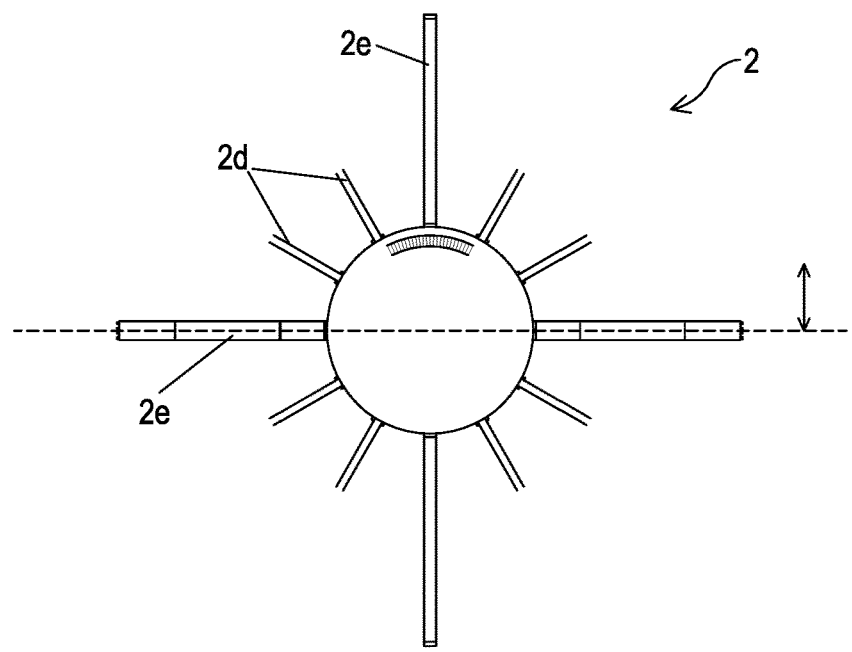

In the arrangement shown in FIGS. 22 and 23, the capture wheel 2 is designed to be capable of disassembly into multiple segments for ease of transportation. In the arrangement shown, the capture wheel 2 is arranged to split into two semi-circular segments, as indicated by the arrows in FIGS. 22 and 23. The two segments may be connected together by bolts and/or welding, or the likes, between struts 2e on the straight edge(s). In alternative embodiments, the wheel 2 may be designed to divide into three or more segments, for example four quadrants. The disassembly into smaller segments may facilitate manual handling and/or transportation—the complete capture wheel 2 may be reconstructed in situ.

In the arrangement shown in FIGS. 22 and 23, the framework 2d, 2e of the capture wheel 2 comprises twelve radial struts 2e and sixteen cross-radial struts 2d. The struts 2d, 2e are arranged to connect the hub 170 to the outer wheel circumference 2b. Alternative types and/or numbers of struts may be used in other embodiments.

The struts 2d, 2e are all arranged in pairs in the arrangement being described—one on or near a front face of the wheel 2 and the other on or near a rear face of the wheel 2. In alternative embodiments, a single strut, for example centrally between the front and rear faces of the wheel, may replace the pair of struts. In the arrangement shown in FIGS. 22 and 23, each semi-circular portion of the wheel 2 comprises a pair of radial struts 2e at the 0° position, a second pair at the +/−90° position, and a third pair at the +/−180° position (three pairs—i.e. six struts—per segment). The 0° position struts 2e are arranged to be connected together, and the +/−180° position struts 2e likewise, when the two semi-circular segments of the wheel 2 are joined together. Each semi-circular segments of the wheel 2 comprises two pairs of cross-radial struts 2d between each pair of radial struts 2e (excluding between the conjoined pairs of radial struts 2e where the segments meet), so a total of four pairs of cross-radial struts 2d per semi-circular segment. The struts 2e, 2d are at least substantially equally spaced angularly around the wheel, excluding the conjoined pairs of radial struts 2e where the segments meet which have substantially no angular separation, in the embodiment being described. Different numbers, arrangements and spacings of struts 2d, 2e may be use in other embodiments. Only one type of strut (e.g. 2d or 2e only, or only rigid struts rigidly connected to both the hub 170 and the rim 2b) may be used in some embodiments.

Figure 21:
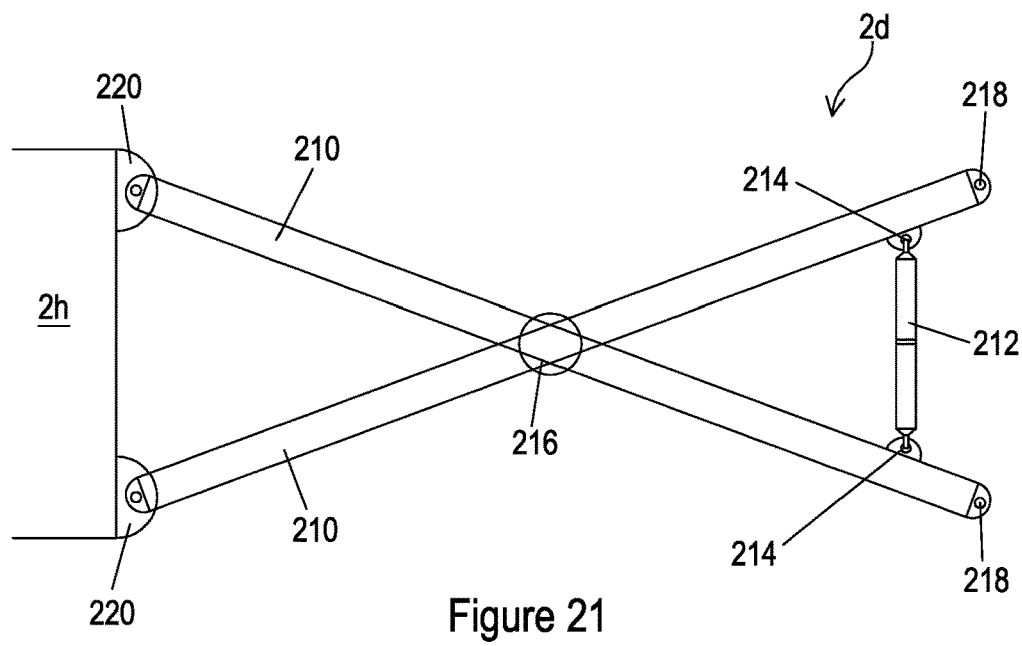
FIG. 21 illustrates a cross-braced damping strut of an embodiment.

FIG. 21 illustrates a cross-radial strut 2d of the embodiment shown in FIGS. 22 and 23. The cross-radial strut 2d comprises two arms 210 extending from the hub 170 to the outer ring 2b; the two arms 210 cross. At the crossing point, the arms 210 are rotatably connected together, such that the arms can move relative to each other with a scissor-type motion. In alternative arrangements, the arms 210 may not be rotatably connected together whilst still being arranged to move relative to each other with a scissor-type motion due to the connection of the ends of the arms 210. The crossing point is around 50% of the way between the hub 170 and the rim 2b in the example shown in the figures, but may be differently located in other examples. The cross-radial strut 2d comprises a damper 212 arranged to assist in redirecting and distributing material impacts; the damper 212 is connected between the arms 210, spaced from the crossing point of the arms 210. The damper 212 is arranged to limit relative rotation of the arms 210. The damper 212 is located between the crossing point of the arms and the outer ring 2b in the arrangement shown, but could be located between the crossing point of the arms and the hub 170 in additional or alternative embodiments. More than one damper may be used per cross-radial strut 2d in some embodiments. The cross-radial strut 2d may therefore be referred to as a cross-braced damping strut 2d. In the arrangement shown, the damper 212 is connected to each arm by means of a bushing, optionally a polymer bushing, passing through a welded lug 214 extending from the arm 210. Any suitable connection means known in the art may be used in alternative embodiments.

Figure 27:
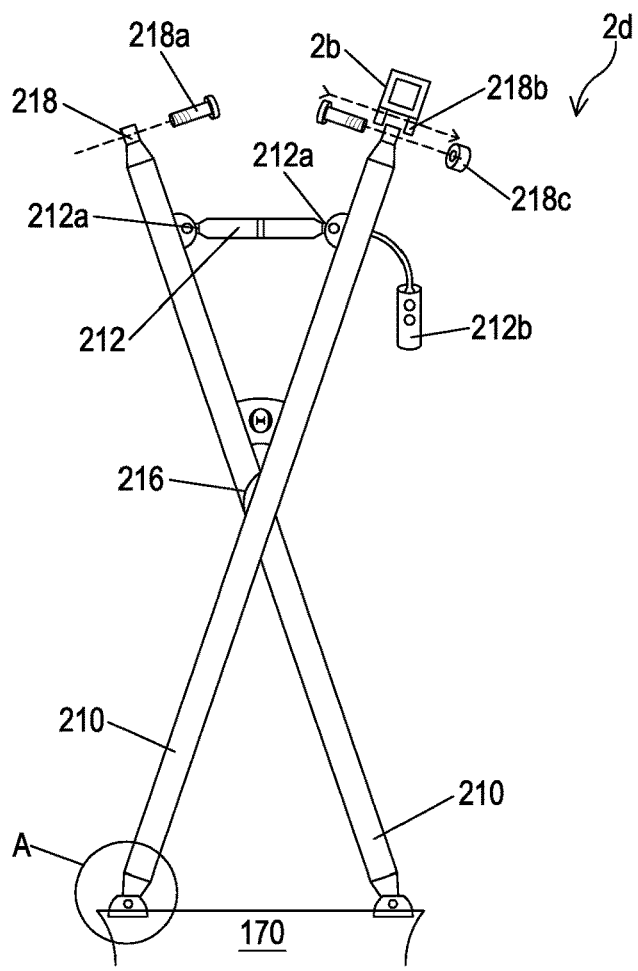
FIG. 27 illustrates a cross-braced damping strut of an embodiment.
Figure 28:
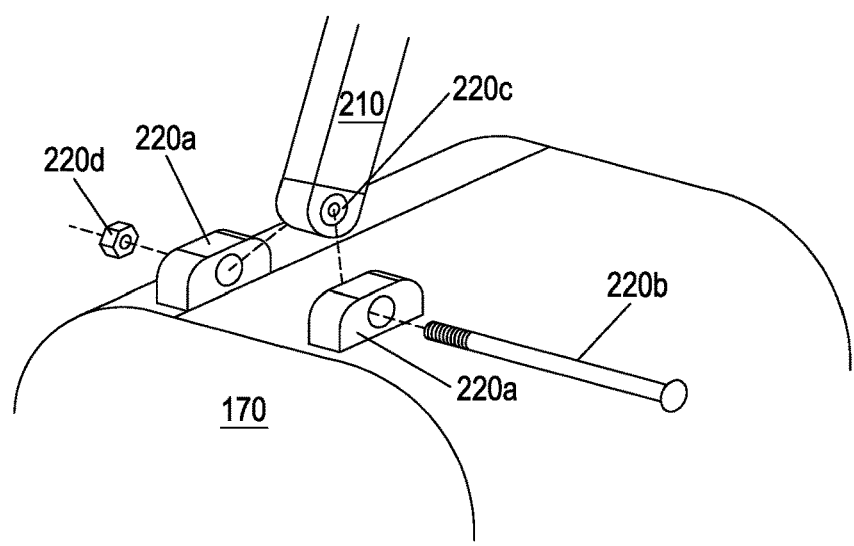
FIG. 28 illustrates the mounting (marked by the circle marked A in FIG. 27) of an arm of the cross-braced damping strut of FIG. 27 to the hub, in perspective view.

In the arrangement being described, the damper 212 is an adjustable damper 212 and comprises a strain gauge 212a at one or both connection points to the arms 210. For example, the damper 212 may be a Proflex™ adjustable damper, optionally of the type with an external fluid reservoir 212b, as shown in FIG. 27. A hose may link the reservoir 212b to the rest of the damper. Data from the strain gauges 212a may be transmitted to a processor, or other processing circuitry, such as the control module mentioned above, and the stiffness of the damper 212 may be automatically adjusted accordingly. Adjustment of the damper 212 may be beneficial when the flow of falling material (e.g. particle size and/or head height), and hence the impact profile, changes. In alternative or additional arrangements, a non-adjustable damper 212, and optionally simply a spring or other biasing member 212 arranged to bias the arms 210 together, may be used. A non-adjustable damper 212 may be replaced manually with a different damper 212 when the wheel 2 is to be used with a feedstock with different flow properties. The damper 212 may be shielded in some embodiments to protect it from the falling material, which might otherwise cause it to jam.

In the arrangement shown, the cross-radial strut 2d comprises a bushing 216, optionally a polymer bushing 216, arranged to facilitate relative rotation at the cross-over point of the two arms 210. The cross-over point is located at a radial mid-point of the cross-radial strut 2d in the arrangement shown. The bushing 216 may allow flexion in line with the damper stiffness/settings whilst itself applying some stiffness in compression between the strut arm mid-points. The combination of the rotational flexibility at the bushing 216 (which allows the overall radial length of the strut 2d to change due to the relative rotation of the arms 210) with an adjustable damper 212 may allow the flexion of the cross-radial strut 2d to be adjusted as desired for expected impacts. The angle, Θ, between the two arms 210 changes as the strut 2d flexes. The change in angle may be limited (by e.g. the damper 212 and/or wheel geometry and rim stiffness) to around 10% of the unstressed angle—for example being +/−4° for an unstressed angle of 40° between the arms 210.

In the arrangement shown, the bushing 216 has a length extending across the width of the wheel 2 that is wider than twice the width of each arm 210, so allowing both arms 210 to be mounted on the bushing 216 whilst not touching the other arm 210.

The outer ring 2b of the wheel framework is connected to the cross-radial struts 2d by means of bushings 218, optionally polymer bushings. The bushings may allow relative rotation of the strut arms 2d with respect to the outer ring 2b, so providing adjustable flexion, whilst holding the outer ends of the arms 210 to a fixed location on the wheel circumference. In the arrangement shown in FIG. 27, the rim 2b comprises a pair of lugs 218b arranged to locate an outer end region of each arm 210 of the cross-radial struts 2d. An end region of the arm 210 comprises a polymer bushing insert around an aperture, arranged to lie between the lugs 218b. A bolt 218a is arranged to pass through a first lug, through the aperture in the arm 210, and through the second lug. The bolt 218a may be a high tensile bolt, optionally made of steel. A locking nut 218c holds the bolt 218a in place. Any suitable connection known in the art may be used in other embodiments.

Each arm 210 is a box-section metal tube, and more specifically made of an alloy such as stainless steel, in the arrangement being described. The hollow arms 210 may provide sufficient stiffness without excessive weight. Solid (non-hollow) arms 210 may be used in alternative embodiments. Arms 210 with alternative cross-sections, e.g. circular, may be used in other embodiments.

Figure 26:
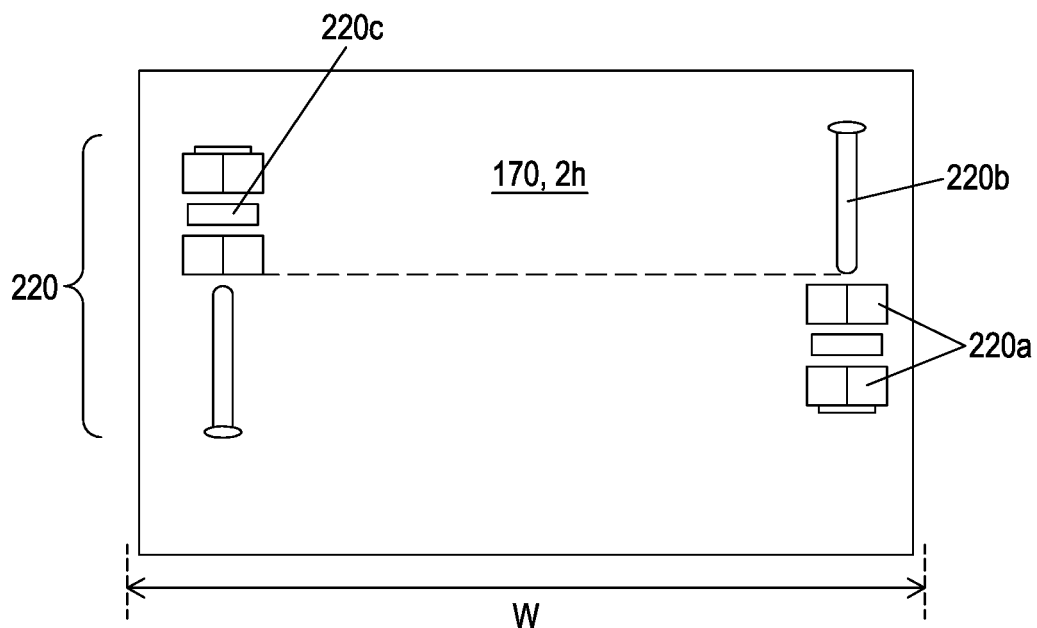
FIG. 26 illustrates the mounting of the cross-braced damping strut of FIG. 21 to the hub, in plan view.

The hub 170 is connected to the cross-radial struts 2d by means of pivotable bolts extending through welded lugs 220a on the outer support ring 2h. The connections 220 may allow relative rotation of the strut arms 2d with respect to the hub 170, so providing adjustable flexion, whilst holding the inner ends of the arms 210 to a fixed location on the hub circumference. Any suitable connection known in the art may be used in other embodiments. FIG. 26 illustrates a possible arrangement for the connection 220 of a pair of arms 210 of a cross-radial strut 2d to the hub 170, and more specifically to the outer support ring 2h of the hub 170 of the arrangement being described. Each arm 210 has a corresponding pair of lugs 220a on the hub 170. The arm 210 is arranged to fit between the pair of lugs 220a. A bolt 220b passes through each lug 220a and through holes provided in the arm 210 between the lugs 220a. A nut 220d, for example a steel bolt nut, may be used to hold the bolt 220b in place. A bushing 220c is provided, fitting within the hollow section of the arm 210 in the arrangement being described. The bushing 220c may facilitate relative rotation of the arm 210 and hub 170. The two connections 220 are offset from each other, as indicated by a dotted line in FIG. 26. The two arms 210 may therefore be spaced apart by the width of two lugs 220a, or more, for example having a spacing of around 2.5 cm (1") between the arms. The bushing 220c may be a polymer bushing 220c and may be provided as an insert within the strut arm 210. The polymer bushing 220c may have a steel inner sleeve.

Unlike the cross-radial struts 2d, the radial struts 2e are arranged to be effectively rigid, and to therefore have a constant length (in the radial direction). In the example shown in FIGS. 24 and 25, each radial strut 2e is arranged to be slidably connected to the outer ring 2b, more specifically comprises an aperture 242 arranged to allow the outer ring 2b to pass therethrough, the aperture allowing the wheel rim 2b to move relative to the radial strut 2e. In the embodiment being described with respect to FIGS. 24 and 25, the aperture 242 is created by a removable end portion 241 to each strut 2e, the removable end portion being secured to the rest of the strut 2e, e.g. by means of two or more bolts, once the outer ring 2b is in place. The strut 2e and removable end portion 241 each have an indentation, the indentations aligning to form an aperture 242 or channel through the strut 2e. In the embodiment being described, each aperture 242 has a width greater than that of the outer ring 2b, so allowing some sideways/transverse relative movement between the strut 2e and the outer ring 2b. In this embodiment, the aperture 242 is oval in shape, with its longer axis parallel to wheel width/the drive shaft (perpendicular to wheel diameter and circumference). The aperture 242 is sized to prevent relative radial movement in the arrangement being described. In this embodiment, the aperture 242 is lined with a polymeric bushing. In alternative embodiments, different aperture shapes and/or designs may be used, and/or a different bushing or no bushing may be used. In the embodiment being described, circumferential movement of the ring 2b with respect to the radial struts 2e is limited or prevented by a pair of stops 244, one located on the ring 2b on each side of the strut 2e. In the arrangement shown, the ring 2b is threaded, or at least comprises threaded portions, and the stops 244 are locking adjustable threaded steel rings. The stops 2b are arranged to be screwed so as to be located firmly on either side of the strut 2e, preventing any circumferential/rotational movement. Stops 244 may be welded in place in some embodiments, for example when ease of future disassembly and reassembly is immaterial. In alternative embodiments, no stops 244 may be provided, and circumferential movement of the rim 2b relative to the strut 2e may be allowed, or the stops 244 may be spaced from the strut 2e to allow some, but limited, circumferential movement of the rim 2b relative to the strut 2e.

The transverse relative movement between the radial struts 2e and the outer ring 2b (indicated by the arrows labelled "+" and "−" in FIG. 25), in combination with the flexion provided by the cross-radial struts 2d, may facilitate damping of impacts.

Figure 25:
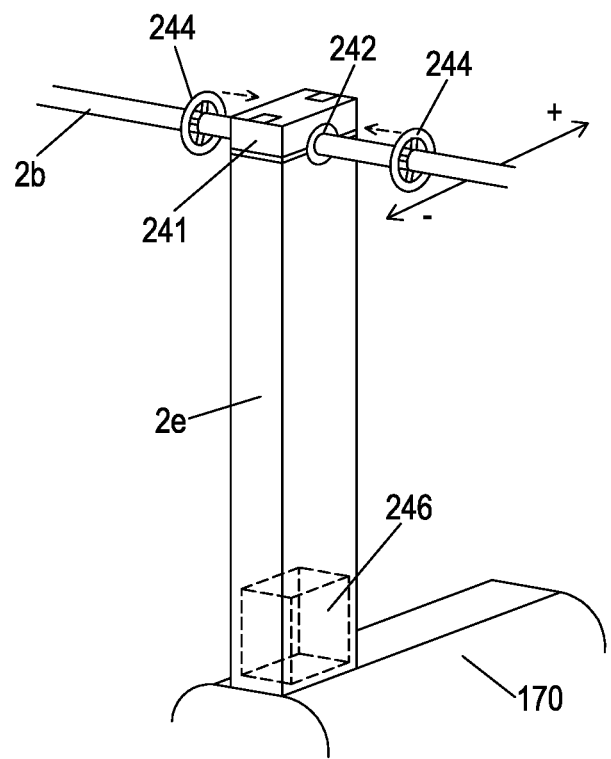
FIG. 25 illustrates the mounting of a single radial strut as shown in FIG. 24.

In the arrangement shown in FIG. 25, each strut 2e is a box-section strut and is mounted to the hub 170 by a box-section insert 246 extending from the hub 170. In some such embodiments, the box-section insert 246 may be welded to, or formed integrally with, the outer support ring 2h of the hub 170. The struts 2e may then be bolted or welded in place on the inserts 246 once appropriately located. Alternative or additional connections known to the skilled person may be used in other arrangements.

In various embodiments, the framework 2d, 2e may be made of a metal or metal alloy such as steel or aluminium, or a composite material, or the likes.

Figure 24:
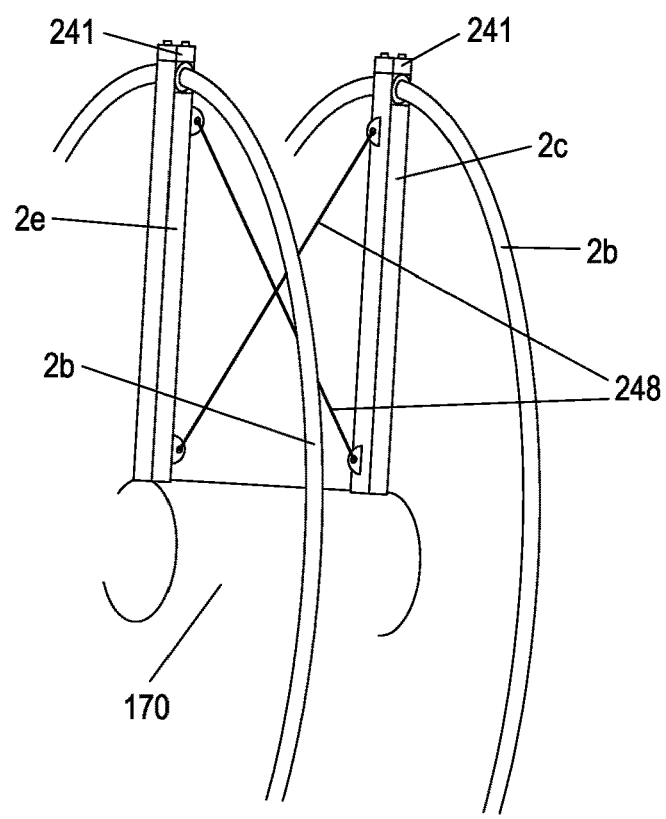
FIG. 24 illustrates a pair of radial struts.

In the arrangement shown in FIG. 24, cross-bars 248 are provided between the radial struts 2e of a pair for reinforcement. The cross-bars 248 may be welded to the struts 2e. The cross-bars 248 may be made of steel or the likes.

In the arrangement shown, one ring 2b passes through the struts 2e on or near a front face of the wheel 2 and a second ring 2b passes through the struts 2e on or near a rear face of the wheel 2; buckets 2a may be suspended between the two rings 2b, across the width of the wheel 2. In some embodiments, the two rings 2b may be connected by struts, and/or a top plate, or the likes extending between the two rings 2b. The top plate, if present, may be made of metal (e.g. steel or aluminium), and/or may be made of or coated with a resilient material such as rubber for extra impact absorption.

In various embodiments, the capture wheel 2 may be arranged to be used with detachable/replaceable bucket sections 2a. As described above, the buckets sections 2a may be constructed of stainless steel, a laminated composite material, rubber, or the likes. An open mesh design may be selected, as relatively large-particle size/coarse falling material may be the desired feedstock. A bucket 2a made of a resilient material, such as rubber, may reduce impact vibration and environmental noise, and may further reduce impact transfer to the drivetrain in use. Use of detachable buckets 2a may facilitate replacement in case of damage.

The buckets 2a may be mounted to the wheel 2 by two or more bushings (e.g. one on each ring 2b); the bushings may be made of polyurethane or composite materials or the likes. The bushings may facilitate rotation of the buckets 2a as the wheel 2 rotates.

The skilled person would appreciate that the strut 2d, 2e and/or bucket 2a designs as described herein may be used with a single-material hub 170 (without a resilient layer) in some embodiments—for example, for relatively low impact falling feedstock, the impact absorption provided by resilient buckets 2a, and/or by the adjustable flexion of the framework 2d, 2e, may sufficiently reduce impact transmission to a drive shaft 3/drivetrain without use of a resilient material 2g in the hub 170. Alternatively, a dual-mass hub 2f, 2g, 170 as described herein may be used without the strut designs and/or bucket designs described herein.

The apparatus 100, 200 and method 300 described are operable to generate electricity without using any fossil fuels or any additional energy, as it is arranged to be disposable within a processing line in a mining processing site or the likes, below a source of falling material. The adaptations of the wheel 2 may allow it to receive impacts from falling rocks and the likes with reduced damage as compare to traditional capture wheel designs, or no damage.

Moreover, the apparatus 100, 200 and method 300 do not require any infrastructure and can therefore be used in a remote and isolated environments or regions. Further, in various embodiments the apparatus 100, 200 and can be transported within a work-site or from one work-site to another with relative ease, as the mechanical assembly may be housed within a transportable housing 1.

The invention claimed is:

1. An energy-generation apparatus (100, 200) arranged to be positioned below a falling material and to generate electricity from the falling material, the energy-generation apparatus comprising:
    a cuboid transportable housing (1), wherein the transportable housing (1) has a height and a width between 120 cm and 300 cm, and a length between 300 cm and 2000 cm;
    a capture wheel (2) mounted on the transportable housing (1), wherein the capture wheel (2) is arranged to receive the falling material and to be caused to rotate by the falling material; and
    a generator (10) located within the transportable housing (1), the generator (10) being arranged to be driven by rotation of the capture wheel (2) to generate electricity.

2. The energy-generation apparatus (100, 200) of claim 1, wherein the transportable housing (1) comprises a shipping container.

3. The energy-generation apparatus (100, 200) of claim 1, further comprising a plurality of supporting props (19) arranged to extend downwardly from the transportable housing (1) and to bear the weight of the transportable housing (1).

4. The energy-generation apparatus (100, 200) of claim 1, wherein the wheel (2) comprises a stainless steel central hub (2f), the central hub (2f) being encapsulated in a layer of a resilient material (2g), and an aluminium framework (2e) extending therefrom.

5. An energy-generation apparatus (100, 200) arranged to be positioned below a falling material and to generate electricity from the falling material, the energy-generation apparatus comprising:
    a cuboid transportable housing (1);
    a capture wheel (2) mounted on the transportable housing (1), wherein the capture wheel (2) is arranged to receive the falling material and to be caused to rotate by the falling material;
    a generator (10) located within the transportable housing (1), the generator (10) being arranged to be driven by rotation of the capture wheel (2) to generate electricity; and
    wherein the capture wheel (2) is mounted on a wheel shaft (3), the wheel shaft (3) passing through a wall of the transportable housing (1), such that the capture wheel (2) is located outside of the transportable housing (1) and linked to the generator (1) located within the transportable housing (1) via the wheel shaft (3).

6. The energy-generation apparatus (100, 200) of claim 5, wherein the transportable housing (1) comprises a shipping container.

7. The energy-generation apparatus (100, 200) of claim 5, wherein the wheel (2) comprises a stainless steel central hub (2f), the central hub (2f) being encapsulated in a layer of a resilient material (2g), and an aluminium framework (2e) extending therefrom.

8. An energy-generation apparatus (100, 200) arranged to be positioned below a falling material and to generate electricity from the falling material, the energy-generation apparatus comprising:
    a cuboid transportable housing (1);
    a capture wheel (2) mounted on the transportable housing (1), wherein the capture wheel (2) is arranged to receive the falling material and to be caused to rotate by the falling material, the capture wheel (2) comprising an outer ring (2b), and wherein an outer surface of the outer ring (2b) comprises a layer of a shock-absorbent material; and
    a generator (10) located within the transportable housing (1), the generator (10) being arranged to be driven by rotation of the capture wheel (2) to generate electricity.

9. The energy-generation apparatus (100, 200) of claim 8, wherein the transportable housing (1) comprises a shipping container.

10. A capture wheel (2) arranged to receive a solid falling material and to be caused to rotate by the solid falling material; the capture wheel (2) comprising:
    a hub (170), the hub (170) comprising a central core (2f) encapsulated in a layer of a resilient material (2g); and a wheel framework (2b, 2d, 2e) extending from the hub (170), wherein the wheel framework is connected to the layer of resilient material.

11. The capture wheel (2) of claim 10 wherein the capture wheel (2) is arranged to drive a generator (10) so as to generate electricity.

12. The capture wheel (2) of claim 10, further comprising a plurality of bucket sections (2a) mounted on the wheel framework (2b, 2d, 2e) and arranged to receive the falling material, and wherein the bucket sections (2a) comprise a shock-absorbent material.

13. The capture wheel (2) of claim 10, wherein the central core (2f) is made of metal and the resilient layer (2g) is made of a polymeric material.

14. The capture wheel (2) of claim 10, wherein the hub (170) comprises an outer support ring (2h) connected to and surrounding the resilient layer (2g), and wherein the wheel framework (2d, 2e) is connected to the outer support ring (2h).

15. The capture wheel (2) of claim 10, wherein the resilient layer (2g) has a thickness of 40-50% of the hub radius and is arranged to compress by 0.5% to 5% of the thickness under expected loads.

16. The capture wheel (2) of claim 10, wherein the framework (2d, 2e) comprises a plurality of cross-radial struts (2d) extending between the hub (170) and a rim (2b) of the capture wheel (2), each cross-radial strut (2d) being arranged to flex to allow relative radial movement between the rim (2b) and the hub (170).

17. The capture wheel (2) of claim 10, wherein the framework (2d, 2e) comprises a plurality of radial struts (2e) extending between the hub (170) and a rim (2b) of the capture wheel (2), each radial strut (2e) being arranged to allow relative transverse movement between the strut (2e) and the rim (2b).

18. The capture wheel (2) of claim 10, wherein the capture wheel (2) is arranged to form a part of an energy-generation apparatus comprising:
 a mounting structure (1) on which the capture wheel (2) is mounted; and
 a generator (10) arranged to be driven by rotation of the capture wheel (2) to generate electricity,
and wherein the mounting structure (1) is a transportable housing (1).

19. An energy-generation method (300) for generating electricity from falling material, the energy-generation method (300) comprising:
 obtaining (302) an energy-generation apparatus (100) comprising a transportable housing (1) and a capture wheel (2) arranged to be mounted thereon;
positioning (304) the energy-generation apparatus (100) beneath the falling material such that the capture wheel (2) receives the falling material and is caused to rotate thereby, wherein the positioning (304) the transportable housing (1) comprises removing the capture wheel (2) from inside the transportable housing (1) and mounting the capture wheel (2) on the transportable housing (1); and
 generating (306) electricity using a generator (10) located within the transportable housing (1) and arranged to be driven by rotation of the capture wheel (2).

20. The method (300) of claim 19, wherein the capture wheel (2) is arranged to receive a solid falling material and to be caused to rotate by the solid falling material; the capture wheel (2) comprising:
 a hub (170), the hub (170) comprising a central core (2f) encapsulated in a layer of a resilient material (2g); and
 a wheel framework (2b, 2d, 2e) extending from the hub (170), wherein the wheel framework is connected to the layer of resilient material.

\* \* \* \* \*

UNITED STATES PATENT AND TRADEMARK OFFICE
CERTIFICATE OF CORRECTION

| | | |
|---|---|---|
| PATENT NO. | : 11,199,179 B2 | Page 1 of 1 |
| APPLICATION NO. | : 16/930779 | |
| DATED | : December 14, 2021 | |
| INVENTOR(S) | : Gary Alexander Watson | |

It is certified that error appears in the above-identified patent and that said Letters Patent is hereby corrected as shown below:

In the Claims

Claim 19, Column 36, Line 19 should read as follows: "wherein the positioning (304) of the energy-generation apparatus (100)".

Signed and Sealed this
Fifth Day of July, 2022

Katherine Kelly Vidal
*Director of the United States Patent and Trademark Office*